(12) United States Patent
Swann et al.

(10) Patent No.: US 11,577,168 B2
(45) Date of Patent: Feb. 14, 2023

(54) APPARATUS AND METHOD OF VIDEO PLAYBACK

(71) Applicant: Sony Interactive Entertainment Inc., Tokyo (JP)

(72) Inventors: Andrew Swann, London (GB); Hugh Alexander Dinsdale Spencer, Bicester (GB)

(73) Assignee: Sony Interactive Entertainment Inc., Tokyo (JP)

( * ) Notice: Subject to any disclaimer, the term of this patent is extended or adjusted under 35 U.S.C. 154(b) by 9 days.

(21) Appl. No.: 17/287,017

(22) PCT Filed: Oct. 8, 2019

(86) PCT No.: PCT/GB2019/052840
§ 371 (c)(1),
(2) Date: Apr. 20, 2021

(87) PCT Pub. No.: WO2020/089582
PCT Pub. Date: May 7, 2020

(65) Prior Publication Data
US 2021/0354036 A1 Nov. 18, 2021

(30) Foreign Application Priority Data
Oct. 31, 2018 (GB) ..................................... 1817777

(51) Int. Cl.
*A63F 13/25* (2014.01)
*A63F 13/525* (2014.01)
(Continued)

(52) U.S. Cl.
CPC ........ *A63F 13/525* (2014.09); *A63F 13/5258* (2014.09); *A63F 13/86* (2014.09);
(Continued)

(58) Field of Classification Search
CPC ........ A63F 13/25; A63F 13/52; A63F 13/525; A63F 13/5252; A63F 13/5255;
(Continued)

(56) References Cited

U.S. PATENT DOCUMENTS 9,251,603 B1 2/2016 Kozko
9,573,062 B1 * 2/2017 Long ..................... G11B 27/00
(Continued)

FOREIGN PATENT DOCUMENTS

EP 3086291 A1 10/2016
EP 3874465 A1 9/2021
(Continued)

OTHER PUBLICATIONS

Sung-Yeol Kim, "Depth Map Creation and mesh-based Hierarchical 3-D Scene Reprensentation in Hybrid Camers System" Department of Information and Communications School of Information and Mechatronics, Gwangju Institute, pp. 1-137 (Jan. 1, 2008).
(Continued)

*Primary Examiner* — Omkar A Deodhar
(74) *Attorney, Agent, or Firm* — Matthew B. Dernier, Esq.

(57) ABSTRACT

A method of video playback includes obtaining a 3D reconstruction of at least part of an environment, obtaining video footage of an activity within that at least part of the environment, obtaining data indicating a position and orientation of a first camera within the at least part of the environment that recorded the obtained video footage, and rendering a view of the video footage in alignment with a corresponding view of at least part of the 3D reconstruction, responsive to the position and orientation of the first camera within the at least part of the environment.

12 Claims, 21 Drawing Sheets

(51) Int. Cl.
   *A63F 13/86*      (2014.01)
   *A63F 13/5258*    (2014.01)
   *G06T 7/70*       (2017.01)
   *G06T 15/04*      (2011.01)
   *G06T 17/20*      (2006.01)

(52) U.S. Cl.
   CPC ............... *G06T 7/70* (2017.01); *G06T 15/04* (2013.01); *G06T 17/20* (2013.01)

(58) Field of Classification Search
   CPC ............... A63F 13/5258; A63F 13/86; A63F 2300/577; A63F 2300/6661; A63F 2300/6669
   See application file for complete search history.

(56) References Cited

U.S. PATENT DOCUMENTS

| | | |
|---|---|---|
| 10,055,898 B1 | 8/2018 | Wang |
| 2005/0251017 A1 | 11/2005 | Azar |
| 2007/0082742 A1* | 4/2007 | Takizawa ............... A63F 13/525 463/43 |
| 2014/0313287 A1 | 10/2014 | Qi |
| 2016/0127690 A1 | 5/2016 | Kaehler |
| 2017/0039765 A1 | 2/2017 | Zhou |
| 2017/0087476 A1* | 3/2017 | Perry ................ A63F 13/53 |
| 2017/0282079 A1* | 10/2017 | De La Cruz .......... A63F 13/537 |
| 2017/0323487 A1 | 11/2017 | Parente Da Silva |
| 2018/0253891 A1* | 9/2018 | Dohta .................. G06T 15/503 |
| 2019/0394253 A1* | 12/2019 | Gharbi ............. H04N 21/23805 |

FOREIGN PATENT DOCUMENTS

| | | |
|---|---|---|
| EP | 3874501 A1 | 9/2021 |
| WO | 2010004466 A1 | 1/2010 |
| WO | 2016048204 A1 | 3/2016 |
| WO | 2020089592 A1 | 10/2019 |
| WO | 2020089582 A1 | 5/2020 |

OTHER PUBLICATIONS

International Search Report and Written Opinion for corresponding PCT Application No. PCT/GB2019/052840, 16 pages, dated Jan. 20, 2020.

Combined Search and Examination Report for corresponding GB Application No. GB1817777.4, 8 pages, dated May 2, 2019.

Rematas Kostantinos, et al "Soccer on Your Tabletop" 2018 IEEE/CVF Conference on Computer Vision and Pattern Recognition, IEEE pp. 4738-4747, Jun. 18, 2018.

Examination Report for corresponding GB Application No. 1817777.4, 6 pages, dated Oct. 27, 2021.

* cited by examiner ical environment.

APPARATUS AND METHOD OF VIDEO PLAYBACK

BACKGROUND

The present invention relates to and apparatus and method of mapping a virtual environment.

Players of videogames often want assistance, either to progress within a game if they are stuck or want to discover additional features, or if they want to see examples of good play to improve their own performance, for example to beat a personal best score.

Video captures of in-game footage, optionally together with commentary by the creator of the video (for example walk-throughs and speed-runs on YouTube®, or e-sports on Twitch®) are popular as guides or entertainment, but what they show is limited by the choices made by the creator of the video.

As a result, the benefit of such videos to a viewer wanting assistance for a videogame or to be entertained by it can be highly variable.

SUMMARY

The present invention seeks to address or mitigate this issue.

Further respective aspects and features of the invention are defined in the appended claims.

BRIEF DESCRIPTION OF THE DRAWING

Embodiments of the present invention will now be described by way of example with reference to the accompanying drawings, in which.

DETAILED DESCRIPTION

An apparatus and method of video playback are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Entertainment Device

Figure 1:
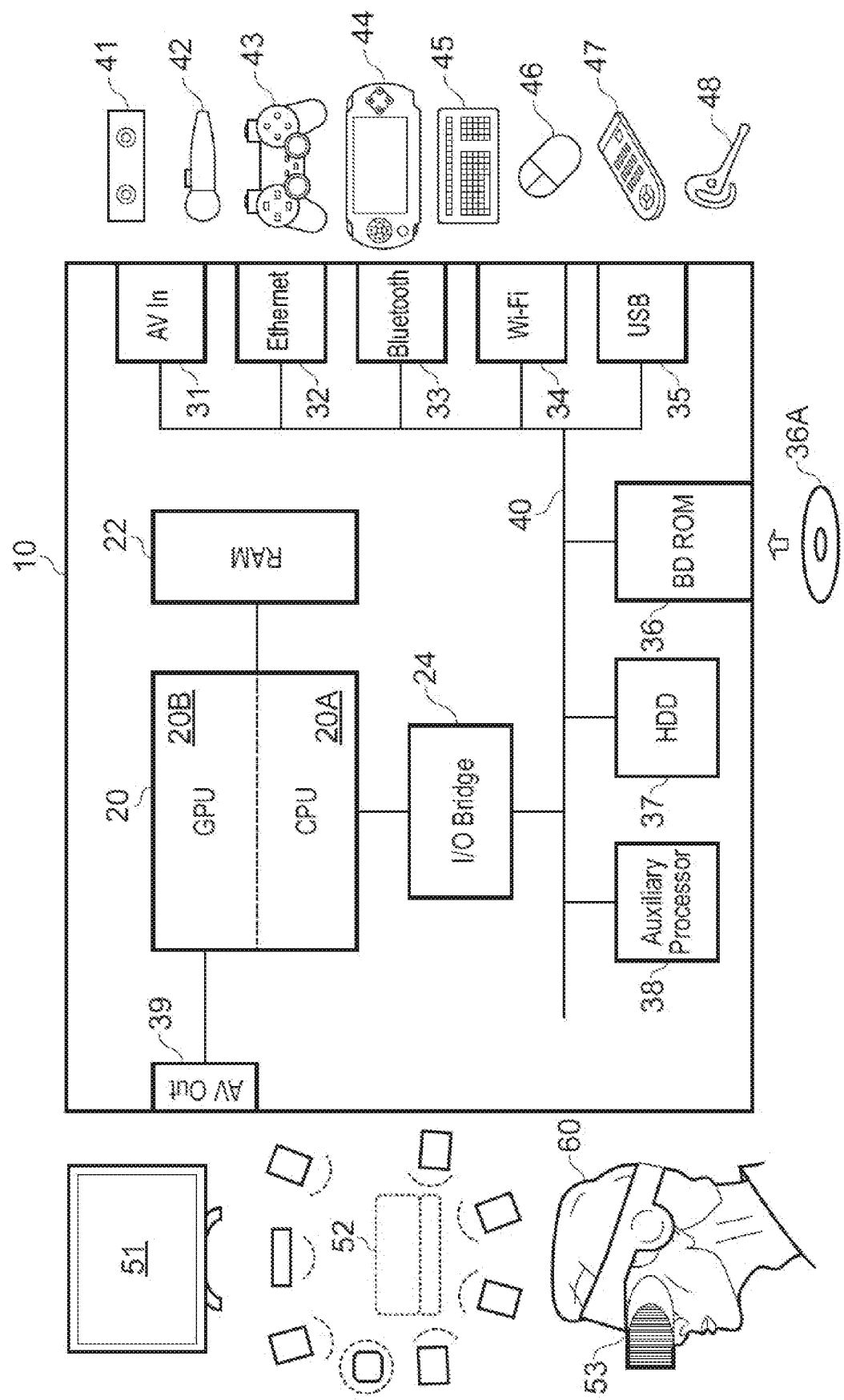
FIG. 1 is a schematic diagram of an entertainment device operable as one or more of the video recording apparatus, video playback apparatus and event analyser in accordance with embodiments of the present invention.

FIG. 1 schematically illustrates the overall system architecture of a Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B.

The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®;

wand-style videogame controllers 42 such as the PlayStation Move® and conventional handheld videogame controllers 43 such as the DualShock 4 ®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

Supplemented Video Recording

Figure 2:
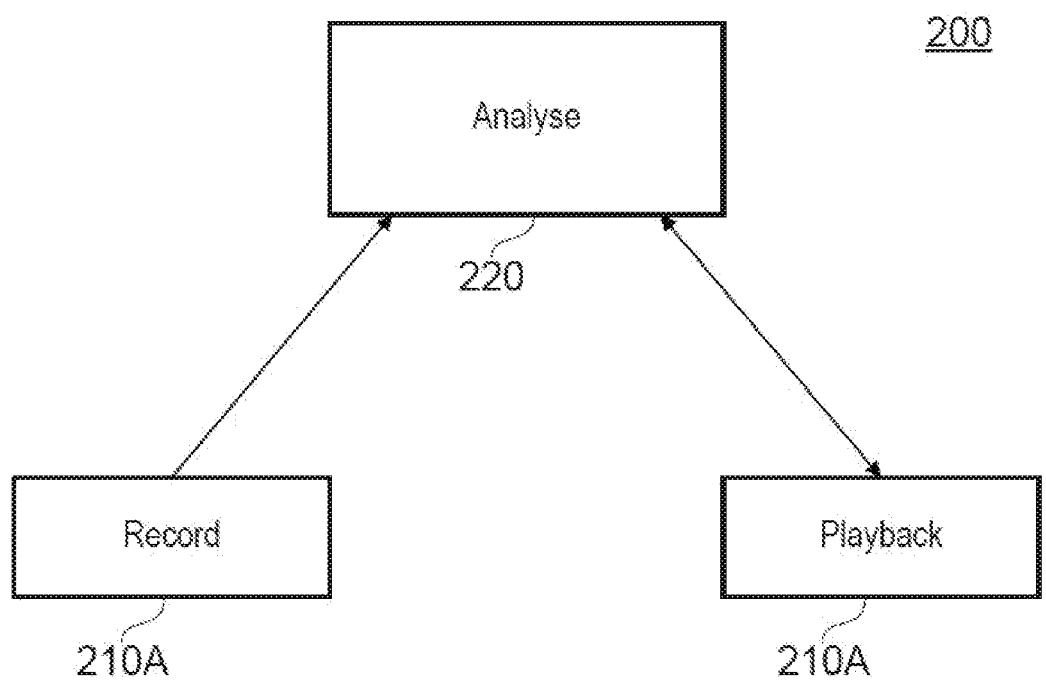
FIG. 2 is a schematic diagram of a system comprising a video recording apparatus, video playback apparatus and event analyser in accordance with embodiments of the present invention.

Referring now also to FIG. 2, the above described entertainment device 10 may operate, under suitable software instruction, as a video recording apparatus (210A) and/or a video playback apparatus (210B) in accordance with an embodiment of the present invention. Optionally the entertainment device may also operate as an event analyser 220, either separately from the recording/playback roles or integrated with the recording role. In other implementations, the event analyser may be a remote server, and/or the video playback apparatus may be a different form of device to the entertainment device 10, such as a mobile phone or tablet, a PC, smart TV, set-top box or different variety of videogame console.

Where the apparatuses are separate devices, they may communicate via the internet (for example using Ethernet® or Wifi® ports 32, 34 as appropriate, or using cellular mobile data).

Figure 3:
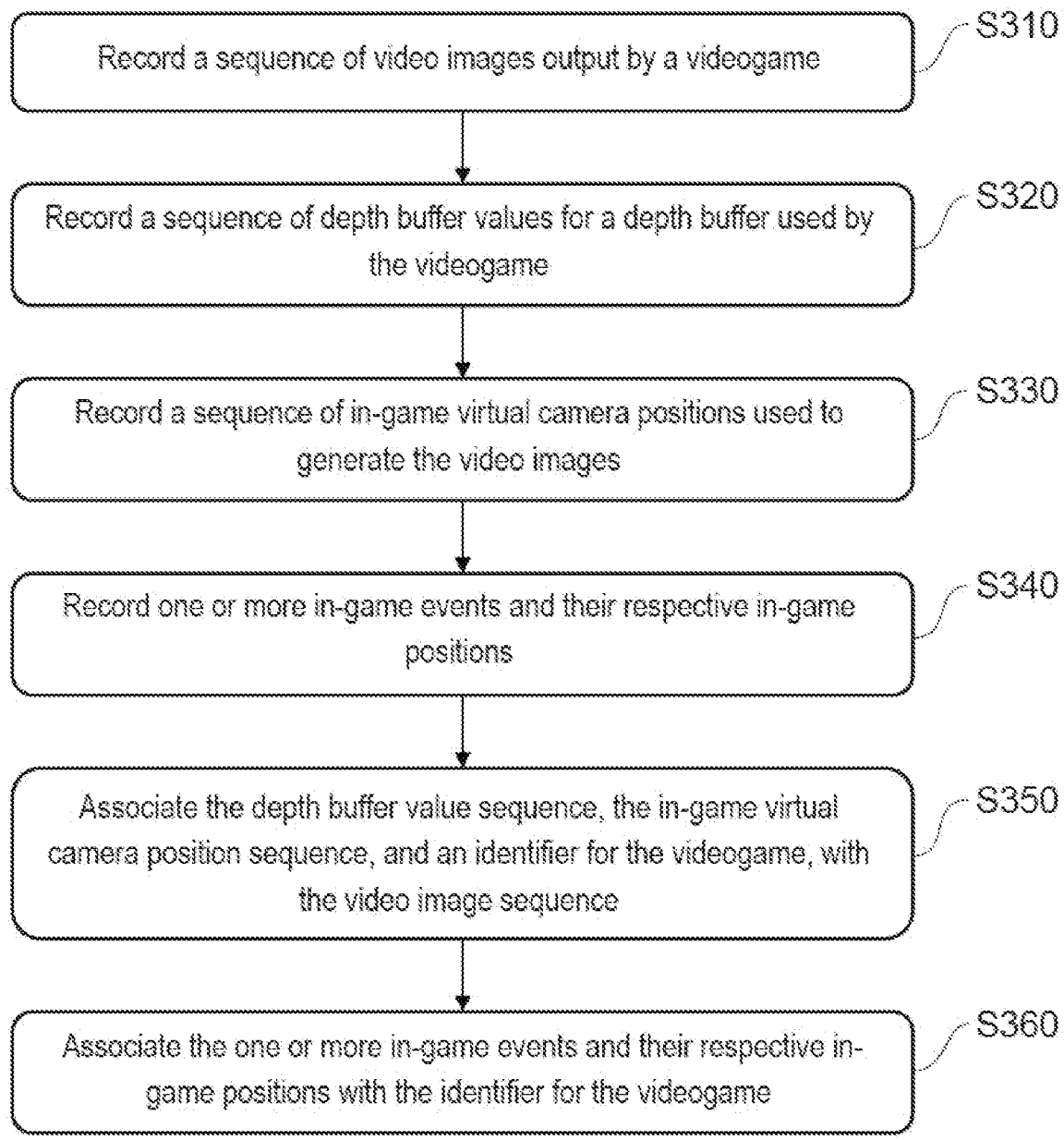
FIG. 3 is a flow diagram of a video recording method in accordance with embodiments of the present invention.

Turning now also to FIG. 3, the video recording apparatus 210A may operate according to the following video recording method in which:

A first step s310 comprises recording a first sequence of video images output by a videogame. For example, the PlayStation 4 routinely saves a video of the current video image output in a data loop that allows the last N minutes of gameplay to be stored, where N may be for example 20 minutes. Subsequently, in response to a user input, an in-game event or scheduled event, such video data can also be copied into long term storage, such as a disk drive of the entertainment device, or a remote host via a network, so that it is not lost when over-written in the data loop.

A second step s320 comprises recording a sequence of depth buffer values for a depth buffer used by the videogame. The depth buffer is used by the entertainment device when calculating which parts of a virtual scene are in front of each other and hence potentially occlude each other in the final rendered image. As such it can provide depth data for each pixel of the rendered image.

In one embodiment, an array of depth data of corresponding pixels of a rendered image can in turn be treated as depth image.

Figures 4A, 4B:
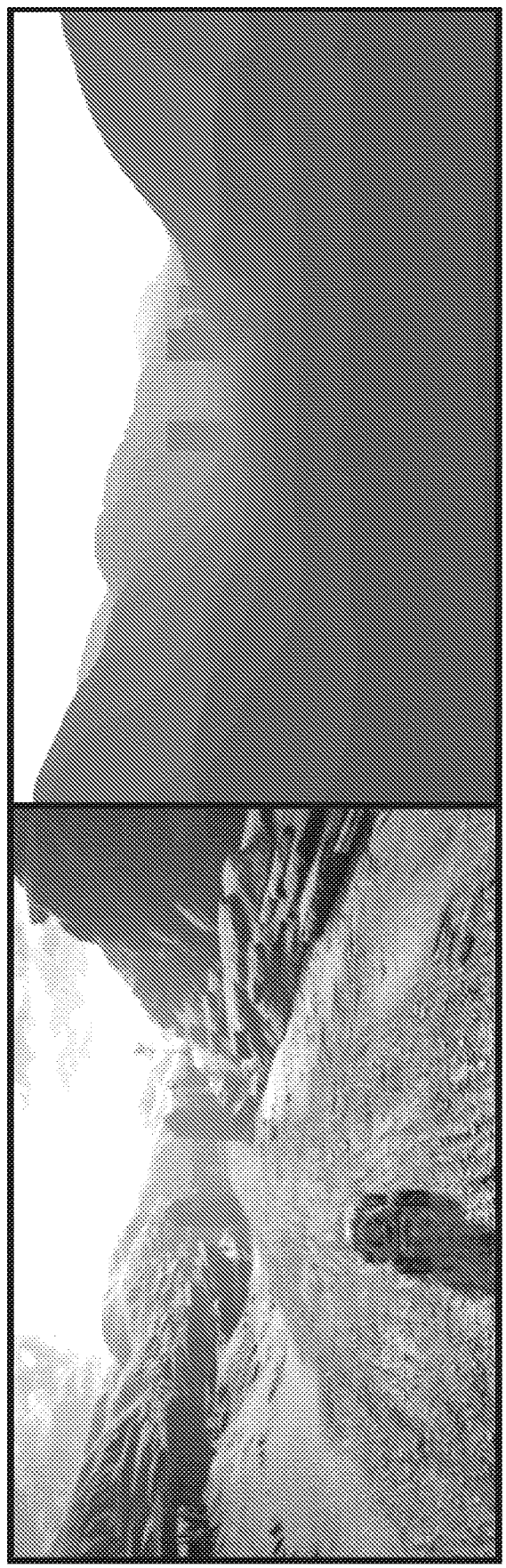
FIGS. 4A and 4B illustrate a video image and corresponding depth buffer information in accordance with embodiments of the present invention.

FIG. 4A illustrates a rendered image whilst FIG. 4B illustrates the corresponding depth buffer values.

A suitable approach for recording a sequence of depth buffer values as a depth image is described later herein.

A third step s330 comprises recording a sequence of in-game virtual camera positions used to generate the video images. The virtual camera position is the position of the camera used when rendering a output video image. The position can be defined as absolute positions with reference to a game world co-ordinate system, and/or relative to a global co-ordinate system with a predetermined origin (for example in this latter case, the location of the virtual camera in the first output video image could be set at the origin, with subsequent camera positions being relative to it). Optionally, as required, additional camera position information may be provided, such as one or more of camera orientation/rotation at the location, field of view, focal length, nearest drawing distance, furthest drawing distance, and the like.

The virtual camera position data may be recorded as a separate data stream or as metadata associated with the encoded depth data, as described later herein, but alternatively may be recorded by encoding the data in a different one of a plurality of image data channels not being used to record depth buffer values.

Also optionally, where the game is not from a first-person perspective (i.e. when the player is not also notionally at the virtual camera position, but has an avatar displayed on screen), then the location of the player and further optionally also one or more of their orientation/rotation, speed, mode (e.g. running/walking) and/or pose may be recorded, using the same co-ordinate scheme or schemes as used to record the virtual video camera location data. Again this may be a separate data steam, metadata, or encoded within an image—for example together with the virtual camera data and in a similar manner.

In an embodiment of the present invention, two colour videos are recorded; a colour video of the rendered and displayed scene as described previously, and also a colour video encoding the 16-bit depth data, typically based on one of the following formats:

An H.265 video using the Main 4:4:4 16 Intra profile in 4:0:0 monochrome at a bit depth of 16 bits, or An H.265 video using the Main 4:4:4 16 Intra profile in 4:4:4 chroma sampling at a bit depth of 16 bits, or A video in a similar format such as High Throughput 4:4:4 16 Intra profile in 4:0:0 or 4:4:4 at 16 bits, for example in any HEVC version supporting these profiles, or equivalent coding schemes, and/or A UCL colour video, in which the 16-bit depth buffer is converted to three colour channels (e.g. RGB values), which can then be stored like a normal video using h264, AV9, h265 and the like.

The UCL colour video enables resilient compression of the depth data (treated as colour data), as explained in relation to live-action video within Fabrizio Pece, Jan Kautz, and Tim Weyrich; 'Adapting Standard Video Codecs for Depth Streaming', Joint Virtual Reality Conference of EuroVR—EGVE (2011), Editors R. Blach, S. Coquillart, M. D'Cruz, A. Steed, and G. Welch, the contents of which is incorporated herein by reference.

In summary, in a UCL colour video format the top 8 bits of a first colour channel are a linear mapping from the 16 bit depth data, to provide an approximate depth value. The second and third colour channels are then mappings (e.g.

triangle waves) also applied to the 16 bit depth data and having a period at least twice the quantisation level of the depth data (e.g. for an 8-bit depth having 256 levels, the period would be ≤512), but with different phases. Due to the phase difference, they encode complementary high resolution depth information with respect to the spatial period of the function. The depth information can then be recovered by reversing the mapping in the first channel to provide a rough depth value, and then reversing the mapping of typically one of the second and third channels, depending on the value from the first channel, to obtain a relative depth value by which to adjust the rough value.

In another format that may be similarly considered, the 16 bit depth data is compressed to 8 bits in a lossy fashion, and stored in the top 8 bits of a first colour channel. Then a first correction layer (e.g. the difference between the original depth layer and a decompressed version for the data in the first colour channel) is stored in the top 8 bits of the second colour channel. Finally, a second correction layer (e.g. the difference between the original depth layer and a decompressed version for the data in the first colour channel as corrected using the correction layer) is stored in the top 8 bits of the third colour channel. Alternatively correction data for a single correction step can be stored between both the second and third colour channels in their respective top 8 bits.

Put another way, in either format the first channel of 8 bits provides a rough but global depth value, whilst the second and third channels of 8 bits provide higher resolution depth information to adjust the rough estimate.

Also in either case, where the video codec comprises for example a 10 bit colour depth, then the 8 bits in each channel are even more robust to video compression.

Notably therefore in either case the 16 bits of the original depth data are stored as 24 bits of encoded depth data within a host data scheme (such as RGB data or similar such as YUV, YCoCg, YCbCr and the like), and preferably those bits do not include at least the lowest significant bit of the host data scheme—although it will be appreciated that some schemes allocate a different number of bits to different channels and so optionally, but less preferably, at least one but not all channels may be fully occupied by encoded depth data. Of course, if potential errors in depth information can be accepted, or the anticipated compression scheme will not affect bit values (or only to a degree that is visually acceptable), then the encoded depth data may occupy all the respective bits of some or all of the colour channels.

Notably whilst the above summary refers to colour channels, in some colour encoding schemes not all channels correspond to a colour per se (for example a channel may indicate luminance); however in each case the scheme as a whole serves to define a point in a colour space, and it is in this sense that the channels are referred to herein as colour channels, or equally as colour-space-descriptor channels.

It will be appreciated that 16 bits of depth data, and compression to 8 bits, in three channels, are all exemplary only. More generally in a UCL colour video, N-bit depth data (where N is typically 16) may be encoded to M bits (where M is typically 8) per colour-space-descriptor channel, and typically M<P, where P is the native bit depth of the respective channel in the host data scheme, and M is preferably 1 bit, or more preferably two bits, fewer than P. The number of colour channels used is typically three (e.g. YUV), but may be different (e.g. CMYK).

Hence more generally encoding the depth buffer value sequence comprises encoding depth data of a first bit depth across a plurality of the colour space descriptor channels used by a selected video scheme, such that a first channel encodes data indicative of depth to a first level of accuracy, and the or each subsequent channel encodes data that, in conjunction with the data of the first channel, is indicative of depth to a second, higher level. Typically, during this encoding the depth data in each channel is then encoded to a bit length shorter than the bit length of the respective channel, although this is not essential.

Accordingly, both the colour video of the rendered environment and the colour-encoded video of the depth data can both be encoded and/or compressed by a conventional video coding technique such as h.265, for example so as to be streamed to one or more viewers, and the quantisation of the depth information will typically be preserved in a manner as robust (or more) than that of the colour data in the rendered video.

Optionally to provide ease of transmission and synchronisation, the two videos may be encoded as a stereoscopic pair (despite not being so).

A fourth step s340 comprises recording one or more in-game events and their respective in-game positions, using a similar scheme to that for the virtual camera location and optional player location. The choice of what in-game events to record in this manner will be made by a designer, but may typically include one or more of crashes/character deaths, overtaking/beating a real or computer based opponent, changing an in-game state of the user (e.g. changing equipped weapons or the like, or engaging a nitrox boost in a car), and player choices (such as turning left or right to avoid an obstacle, or electing to jump over it). In this latter case, the choice may be associated with a predetermined in-game decision point that may be location based (e.g. an obstacle or path choice) or may be logical (e.g. when navigating a dialog tree with an in-game character). In the case of a location based choice, due to user variability regarding when they respond to the choice, the choice made may be associated with the position of the in-game decision point rather than the position of the user or camera, to assist with subsequent analysis of the decision. Alternatively or in addition, such a decision may be encoded when made by the user, or when the in-game decision point is at the nearest draw position with respect to the virtual camera, or at some other predetermined relationship with the virtual camera (for example within a predetermined distance) so as to provide predictability as to which video image may be associated with the choice data, or the choice data may be encoded for each image between these two moments (or similarly for any video frame where the camera and/or user avatar are within a predetermined distance of the in-game decision point). In addition to location specific events, on-going events may also be recorded. Hence optionally for each video image, the current user input or inputs (e.g. buttons pressed, or associated input values) may also be recorded in a similar manner to provide an approximate record of the user's interactions with the game, and similarly the user's in-game position (e.g. avatar positon) may be treated as an ongoing event if different from the camera positon. As is noted later herein, whilst this recording step typically occurs during game play and reflects events arising directly from game play, alternatively or in addition the recording step for such in-game events may occur after the video images and other data have been output, and optionally after they have been broadcast/streamed; that is to say, a viewer subsequently watching the video using a viewer compatible with the techniques herein with have sufficient information available to define their own in-game events after the fact. These may then be shared, e.g. by reposting the updated video, or by transmitting them to a central server, as appropriate and as described later herein.

As is noted above, the data is recorded for each of a sequence of video images output by the videogame, but generally is not recorded as part of the sequence of output video images itself but instead is recorded as a parallel sequence of data with at least the depth data encoded as video images.

In the preferred colour video encoding approach, the other information described herein as being encoded within a colour data channel, such as the virtual camera position, and optionally an avatar position and/or in-game event positions, may be stored as a separate data stream within the colour encoded depth video (or potentially within the video of the rendered output, or potentially in both to provide redundancy, or across both the reduce or balance individual overheads, for example to assist with synchronous streaming of the videos).

For example, this data may be stored in one or more extensible metadata platform streams or similar, respectively associated with one the two videos. Alternatively the selected video scheme may comprise user fields that may accommodate this data.

Hence in a fifth step S350, the depth buffer value sequence is encoded as a second sequence of video images; and in a sixth step S360, the in-game virtual camera position sequence is associated with at least one of the first and second sequence of video images (typically the second sequence of video images).

In a further optional step, an identifier for the videogame is also associated with one or both video image sequences (together with any of the optional additional information also encoded, such as player position, user choices and the like).

The identifier enables subsequent analysis of the video sequence without the need for image-based recognition of the game from which the video sequence has been recorded. The identifier may simply be the name of the game in plain text, or a unique issue number associated with the game. For simplicity, the identifier may correspond to an identifier already associated with the game, for example for the purposes of registering ownership of the game with an administrative service associated with the host videogame console.

Optionally one or more in-game events and their respective in-game positions are associated with the identifier for the videogame.

The in-game events, their respective in-game positions, and the identifier for the videogame may then optionally be uploaded to a remote server operable as the event analyser 220, which receives such data from a plurality of client devices acting as video recording apparatuses, and identifies statistically significant features of the data, as described later herein.

The in-game events and their respective in-game positions may alternatively or in addition be encoded along with the depth buffer value sequence, the in-game virtual camera position sequence, and the identifier for the videogame within a colour channel of the supplementary image sequence, thereby (also) associating them with the identifier for the videogame in this manner. This allows the specific instance of the in-game events to be associated with the specific video recording.

Optionally, each recorded image sequence of a videogame (video recording) may have a unique video ID, which may optionally be transmitted to the event analyser. The event data may then be transmitted to the event analyser in association with the unique video ID. Subsequently the event analyser may then optionally transmit the event data, in addition to any statistical analyses, back to a video playback device that transmits the unique video ID to it.

Similarly optionally the depth buffer value sequence and/or the in-game virtual camera position sequence and any of the other optional data (such as player avatar positon) could also be uploaded to the event analyser in association with the unique video ID.

If all the supplementary data is uploaded in this fashion, it may be provided to the server as a parallel video recording encoded as described previously herein, or as the separate data elements for the server to encode in this manner.

Subsequently when a video playback device transmits the unique video ID found in a video recording, it can receive all of the supplementary data, for example as a parallel video recording encoded as described previously herein.

Alternatively or in addition, the video recorder could upload the parallel video recording to an online host (such as YouTube® or Twitch®) first, obtain the URL associated with the hosted recording, and embed this URL in a user field of the video recording of the game before also uploading that to the online host. Equivalently, after uploading the parallel video recording to the on-line host, using the unique video ID as the video name, the video recorder could embed the video ID in the user field of the video recording to be subsequently used as a search term with the on-line host.

In either case, as long as the unique video ID or URL remains associated with the original video (for example in a user field of the video), then a video playback device adapted to implement techniques disclosed herein can access the desired supplementary data either by requesting it from to the event analyser or accessing the parallel hosted video from an on-line host, whilst the video itself remains otherwise conventional and able to be handled and transmitted by conventional or legacy devices and applications without special regard to also handling and transmitting non-standard supplementary data relating to these techniques.

Supplemented Video Playback

Figure 5:
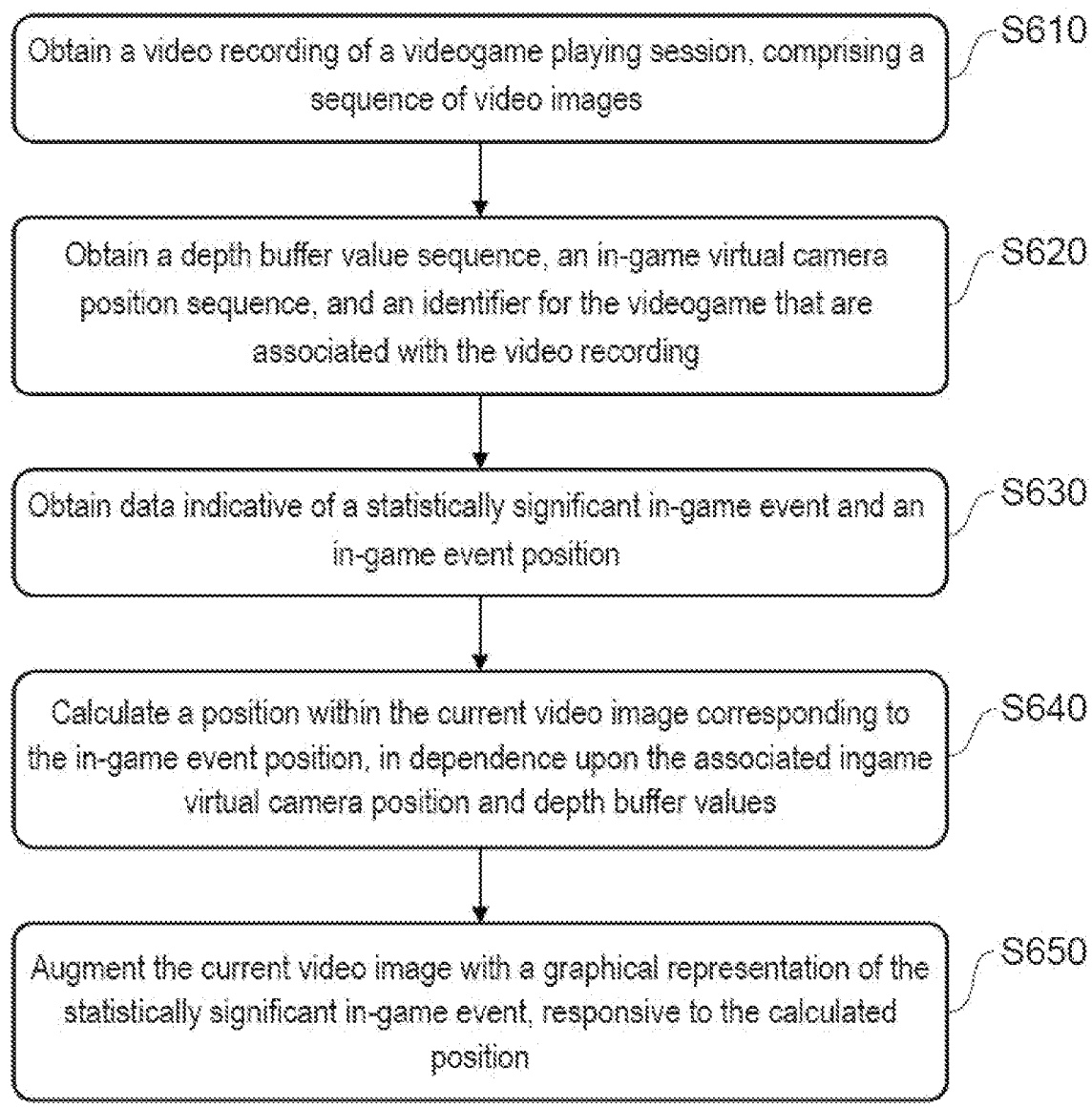
FIG. 5 is a flow diagram of a video playback method in accordance with embodiments of the present invention.

Turning now to FIG. 5, the video playback apparatus 210B may operate according to the following video playback method in which:

A first step s610 comprises obtaining a first video recording of a videogame playing session, comprising a sequence of video images. This may be done by any suitable means, such as downloading a video file, streaming a video stream for a web service such as YouTube® or Twitch®, or accessing a video recording already in a local memory (such as an HDD 37 or BD ROM 36/36A) of the playback apparatus.

A second step s620 comprises obtaining a second video recording generated by encoding a depth buffer value sequence (such as the H.265 and UCL examples herein).

A third step s630 comprises obtaining an in-game virtual camera position sequence associated with at least one of the obtained video recordings, for example as a data file provided with a video recording, or a metadata extension, or a user field. Optionally additional data such as avatar positions and in-game event data may also be included.

Alternatively such a parallel video recording comprising encoded data, and/or one or more of the other data sequences (camera position, avatar position, event position etc.), may be accessed by reference to a unique video ID obtained from a data field of a received video recording and submitted to the event analyser server, or alternatively by reference to a URL or search term obtained from a data field of a received video recording that is used to access the data from a data hosting service.

It will be appreciated that the supplementary data may be downloaded in its entirety, or alternatively streamed at the same rate as the video recording of the videogame (and as applicable the depth data video) so that the supplementary data is provided in a just-in-time manner. Optionally the supplementary data may be streamed with a predetermined frame offset (for example 1, 2, 3 or more frames in advance relative to the video recording of the videogame) to provide sufficient processing time to have processed information ready for reception of the corresponding video frame of the videogame, and/or to provide any smoothing, averaging or error correction functions for supplementary data that would depend upon receipt of subsequent frames of supplementary data. This could be achieved by padding the video recording of the videogame with the desired predetermined number of blank frames at its start, or delaying playback of the video recording of the videogame by the desired predetermined number of frames. Such a processing time offset may also optionally implemented if encoding the game footage and depth video as a stereoscopic pair, so that the depth video is a predetermined one or more frames in advance of the game footage.

As noted above, optionally in-game event data may be obtained at this stage, thereby subsequently allowing augmentation (e.g. displaying a path taken, or a user comment) responsive to that in-game event by itself.

However, alternatively or in addition, an optional further step S635 comprises obtaining data indicative of a statistically significant in-game event and an in-game event position. As described elsewhere herein, this data is obtained from the event analyser, either as a file, or streamed to the video player during playback. The data typically comprises data indicative of the in-game event analysis data, e.g. data relating to the significance of the event and optionally other statistical data (and typically also the type of event, etc., to assist with selecting how to graphically represent the event).

As was noted previously, the choice of what in-game events have been recorded may have been made by designer and may include one or more of crashes, character deaths, overtaking or beating an opponent or indeed being overtaken or beaten by an opponent, changing the in-game state of the user, player choices and/or player inputs. As noted above, augmentations based upon these events per se may be provided. However, optionally this data may be analysed as described elsewhere herein, and data relating to this analysis may then be associated with the event location.

If the data is subsequently downloaded as a file in advance of video playback displaying a particular in-game location, then the event location may be used to decide when to use the event analysis data, whereas alternatively or in addition when the data is subsequently streamed in synchronisation with playback of a recording of the videogame, then the event analysis data may be streamed according to when the recording of the videogame reaches the event location, optionally in terms of a predetermined offset from the camera position or optionally from the player avatar position for that moment in the recording.

A fourth step S640 then comprises calculating a position within a current video image of the first video recording (the game footage) corresponding to the in-game event position, in dependence upon the associated in-game virtual camera position and decoded depth buffer values obtained from the second, depth video.

Hence if for the currently displayed video image of the videogame the position of the camera using the in-game or global co-ordinate system is known, and the depth data of the pixels in the display video image are known or can be interpolated from the associated depth data, then in effect the in game or global (X, Y, Z) coordinate of each pixel in the currently displayed video image of the videogame can be determined. Accordingly, the position of the in game event within the currently displayed video image can be determined.

In particular, if for a given event, the corresponding X, Y coordinate in the currently display video image is determined to have a Z coordinate that is closer than the Z coordinate of the event, then in effect the event is obscured from the current viewpoint of the display video image by an object within the virtual environment depicted within the video image.

Using this information, at a fifth step s650 a video playback device can augment the current video image with a graphical representation of an in game event, responsive to the calculated position. In particular the video playback device can decide whether or not to occlude some or all of a graphical representation of the in game event based on whether elements of the displayed environment are currently in between the game event location and the viewpoint presented by the video. For example, the video playback device may prepare for rendering a simple polygon based object such as a tetrahedron, acting as a pointer, and then use the Z values of the video image to perform a so-called z-culling on the tetrahedron in a final render so that the tetrahedron appears to be naturally embedded within the environment of the video, being occluded as suitable from the current viewpoint of the virtual camera that recorded the video image. Hence the technique may comprise calculating, in dependence upon the depth buffer values, any occlusion of the graphical representation at the calculated position caused by foreground elements of the video image.

The playback device may not augment every obtained in-game event. For example, the viewer may be able to toggle which event types to display, or set an event threshold (for example, only show an event that add more than a threshold value to the score). Similarly, the playback device may also show statistically significant in-events or a subset, or only show statistically significant events or a subset, depending on playback settings.

Figure 6:
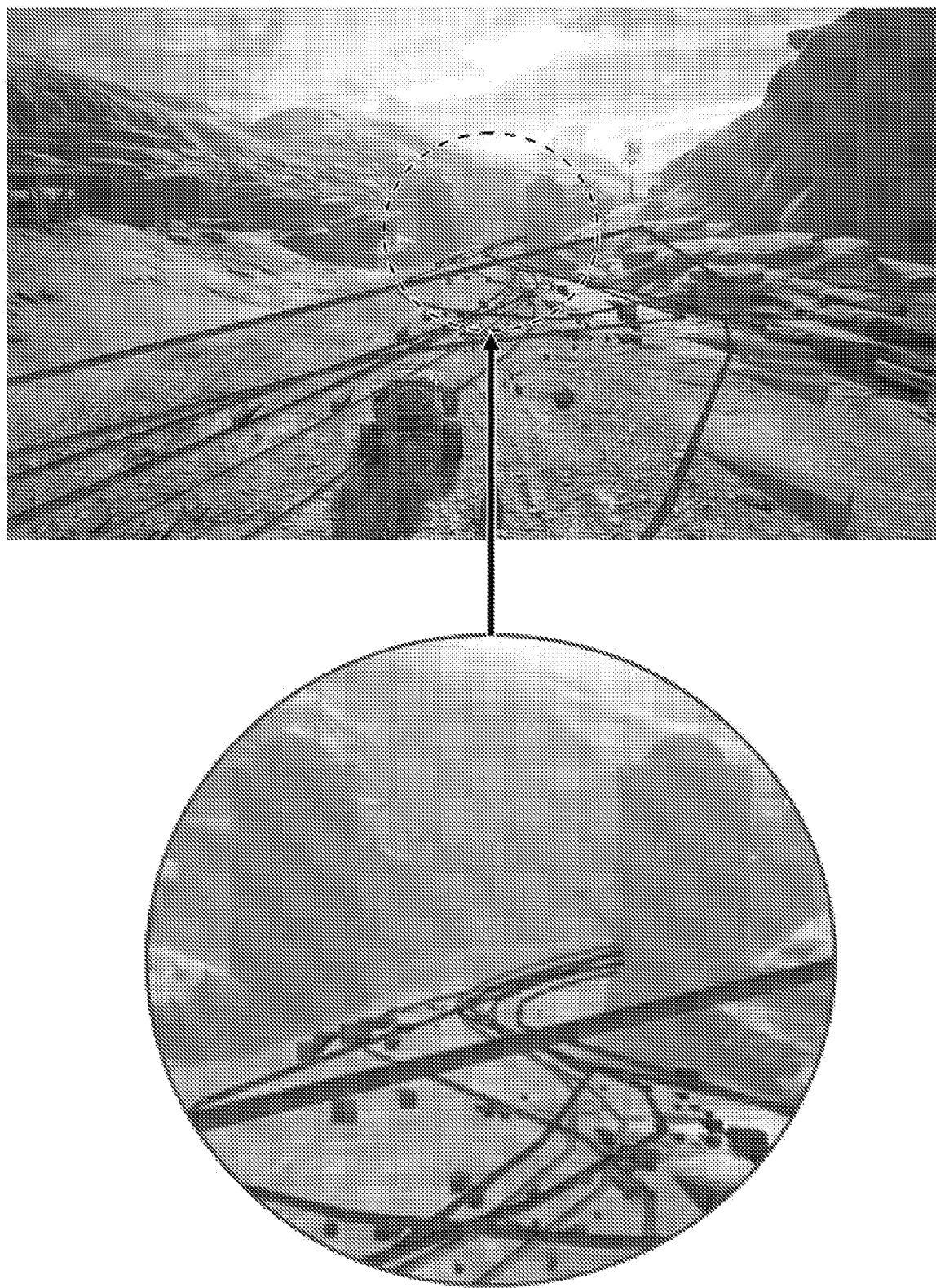
FIG. 6 illustrates an augmentation of a video with a graphical representation of a statistically significant in-game event, in accordance with embodiments of the present invention.

FIG. 6 illustrates this augmentation for the example video image of FIG. 4A. In this figure, paths of other players (for example particularly fast or slow players in red or blue tracks respectively) are shown. For a greyscale reproduction, the specific meaning of each track is not necessary to an understanding of the invention. Notably, as seen in the expanded section, the tracks disappear behind features of the environment as the Z position of the track data exceeds the Z position of the features within the video image.

FIG. 6 also shows simple polygon objects (in this case tetrahedra) indicating events such as vehicle skids or braking. It will be appreciated that more elaborate, visually appealing and informative indicator objects, optionally with textures of their own, may be used for this purpose, and that typically a different respective graphical representation will be used for corresponding different event types. It will be appreciated that other graphical effects may be applied, such as reducing the brightness of video pixels whose x,y,z position intersects a line in a predetermined direction from an indicator object, thereby creating an apparent shadow of the indicator object within the videoed game environment, and so improving the apparent immersion of the indicator object. Similarly, the video playback device may analyse the effective resolution or compression rate of the video, and degrade the effective resolution of the indicator object to substantially match this (for example by pixelating and/or blurring the rendered object), so that the indicator object appears to be more part of the background video image.

Optionally, the video playback device can also obtain an in-game player position sequence associated with the video recording. Again as described previously this can be in a separate file or stream or encoded within a parallel image sequence. The augmenting stage may then comprise displaying a relationship between the current player position in the video and one or more event positions. This may variously take the form of indicating distance/countdown values between the player position and the event position, adding a line, arrow or path between the player position and the event position, only showing or fading in the indicator object associated with an event when the distance between the player position and the event position are within a predetermined threshold, and the like.

Figure 7:
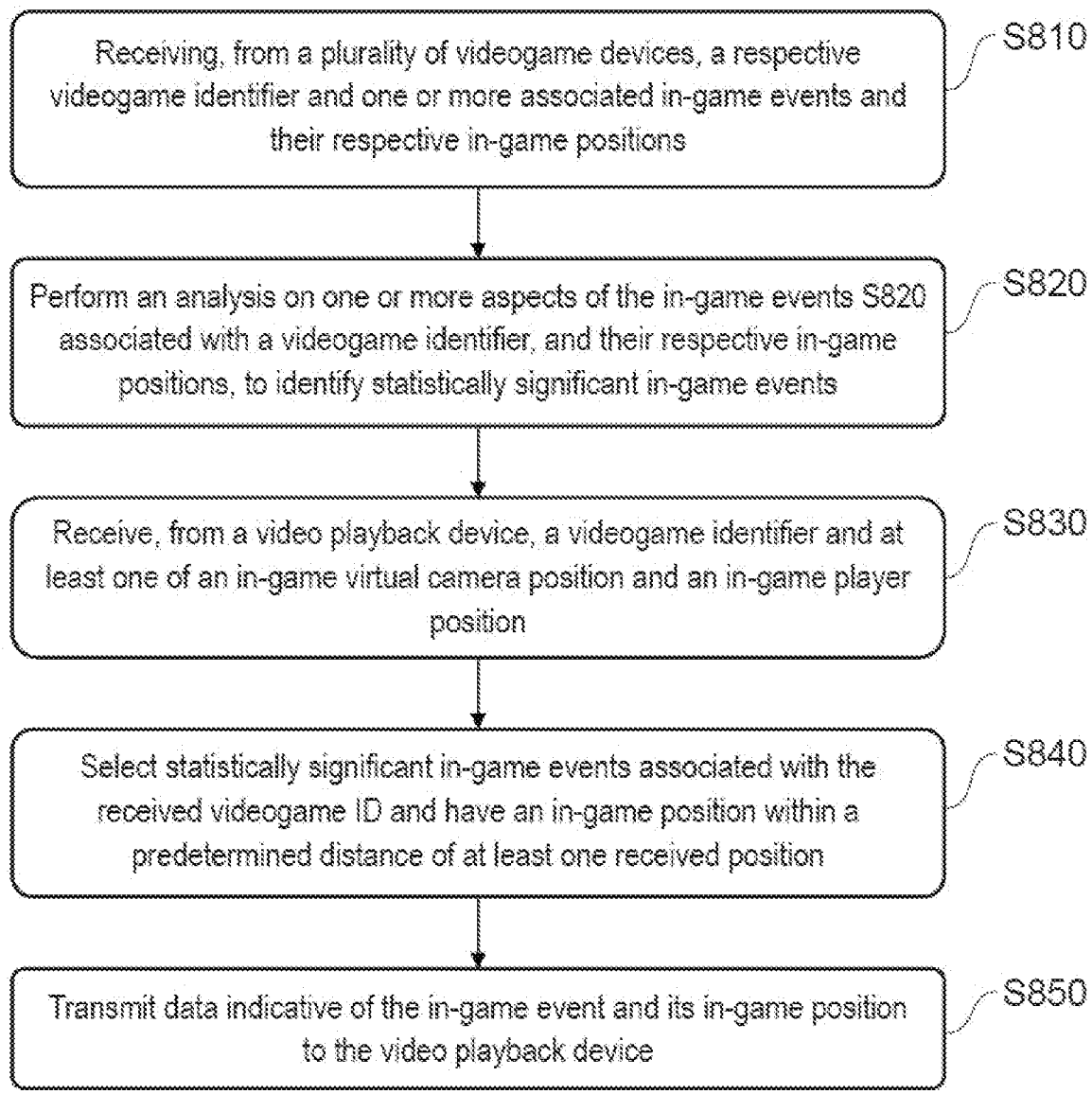
FIG. 7 is a flow diagram of an event analysis method in accordance with embodiments of the present invention.

Turning now to FIG. 7, the server operating as an event analyser 220 may operate according to the following event analysis method, in which:

A first step S810 comprises respectively receiving, from a plurality of videogame devices (acting as video recording apparatuses), a videogame identifier and one or more associated in-game events and their respective in-game positions. Hence as described previously herein, the event analyser receives data relating to a particular videogame that identifies in-game events, and where they occur within the game, from a plurality of videogame devices.

As noted previously herein, optionally the event analyser may receive any of the other supplementary data recorded by a video recording apparatus, together with a unique video recording ID.

A second step S820 then comprises performing an analysis on one or more aspects of the in-game events associated with a videogame identifier, and their respective in-game positions, to identify statistically significant in-game events.

This may be done for example by performing a geospatial analysis of a plurality of events of a similar kind to identify hotspots, cold spots and other group statistics indicative of the behaviour of a corpus of players for that kind of event, or for a particular instance of an event at a particular position.

An aspect of significance for an event can be selected by weighting for it. Hence for example a set of points in game space relating to where users applies the brakes in a racing game can be weighted according to the respective eventual lap times associated with each point.

The analysis then generates a z-score for each point separately (e.g. which reflects how many neighbours also had high weights), and a p-value, indicating if this point is an anomaly.

These analyses can be performed for a particular game title periodically, and/or in response to receiving more data for that game (for example after receiving 1, 10, 100, 1,000, 10,000 or 100,000 additional datasets, as appropriate).

It will be appreciated that different aspects of an event or event type can be analysed separately in this fashion depending on the weighting used. For example, braking events could be analysed with respect to lap times or whether or not the lap was completed, vehicle types, or user demographics.

To this end, it will be appreciated that other information about game play may also be recorded by the video recording apparatus, which may be referred to as session data; i.e. not events within the game play per se, but information about the game play, such as difficulty setting, player skill level or equipment used, final outcomes (times, scores, achievements, rankings or the like) determined after completion of a level, and so-on. In the event that only part of a level is video recorded, the video recording apparatus can thus optionally append such data to the video recording once a level (or other logical point at which to obtain such values) is reached, even if the video recording itself has ceased. Such session data may be stored as a separate file or encoded in any suitable manner within the game video recording or parallel video recording. For example, the session data may be included as one or more frames at the beginning or end of the parallel video recording.

Alternatively or in addition to such geospatial analysis, a user—generated event marker or user ID may be associated with a particular uploaded set of event data.

This allows the event analyser to provide event data corresponding to specific individuals, such as for example players found on a user's friend list associated with their own user ID. In this way, alternatively or in addition to statistical analyses of a wider corpus of players, individual choices and events from friends of the viewer of the playback may be shown as an augmentation of the video, and/or a geospatial analysis restricted to just their friendship group.

This principle could also be extended to clans, teams and other self-identified groups though user-generated markers, so that for example e-sports teams could augment a video posted by a competitor with just an overlay of their performance data.

Expanding further, the geospatial analysis can be performed multiple times for different corpora of players, to provide analyses based on location (e.g. national stats) and demographics, such as age and gender. Such information is generally available from the registration details held in association with each user ID.

In any event, subsequent to the analysis, a third step S830 comprises receiving, from a video playback device, a videogame identifier and at least one of an in-game virtual camera position and an in-game player position.

Hence in addition to receiving data from video recording apparatuses, the event analysis server also receives data requests from one or more video playback apparatuses. The requests identify the videogame in the video so that the event analyser knows what data set to reference (although this may be implicit, for example when an event analysis server is dedicated to supporting only one game, then the act of sending a request to that server constitutes identification of the relevant videogame and data set).

The requests also include at least one of an in-game virtual camera position and an in-game player position. Depending on how the data is transmitted back to the video playback apparatuses, this can take different forms. If data for an entire level (or segment/branch etc. of a level or region) is to be downloaded, then identification of the level serves to identify the position of the camera/player to the extent needed to acquire relevant data.

Meanwhile if the data is being streamed, then the current position of the camera/player corresponding to a displayed frame of the video stream (or optionally a predetermined number of frames ahead, to account for access and network latency) may be used. This allows the received data stream to track the progress of events within the video, which are likely to differ between individual videos due to how each user plays the game, and what events they experience (such as a car crash or breakdown instead of smooth driving) that would otherwise make prediction of what events are relevant to the current video display difficult.

It will be appreciated that in between position updates on a once-per-level and every-frame basis, a number of schemes may be adopted within the technique, such as time or distance based periodic updates of position (e.g. every N seconds or M metres, where N or M are predetermined values). Optionally, triggers may be encoded within the video itself (e.g. a flag or value in a user field) by the video recording apparatus, corresponding to when events occurred during game play, so that when these are encountered during playback then the corresponding camera or player location is transmitted to the event analyser in order to receive data about the corresponding event.

In any event, in response then in a step fourth step S840 the event analysis server selects analysis data relating to one or more identified statistically significant in-game events associated with the received videogame identifier and having an in-game position within a predetermined distance of at least one received position (as noted above, corresponding to a level, periodic time or distance, or current or impending video frame). The predetermined distance may be the draw distance of the videogame, so that an indicator object for the event can appear as if it is part of the in-game render, but in principle may be any predetermined distance from the received position.

The selection of analysis data may follow one or more principles. For example, data that has the greatest significance for an event may be chosen (for example, if users are presented with a choice to turn left or right, and 95% of players who turn right complete the level whilst 95% of player who turn left to not, then this aspect of the decision event is more significant than whether 60% of cars turn right and 60% of motorbikes turn left). Alternatively, data that relates to the apparent choice/event of the player in the video may be preferentially selected. Similarly, data that relates to preferences set by the viewer of the video may be chosen, such as looking for the most common events, or the least common events, or preferred events such as crashes, but not overtaking.

Finally, in a fifth step S850 the event analysis server transmitting data indicative of the in-game event analysis data and its in-game position to the video playback apparatus. Then as noted previously, the video playback apparatus can use the data to construct an augmentation layer for the video, as illustrated in FIG. 6.

It will be appreciated that because the location of in-game events is itself constrained by the rules and environment of the game, the cumulative event data received by the event analysis server will be consistent for that game (e.g. all events related to overtaking will be on positions corresponding to the race track, or at least to positions where overtaking is legal within the game). As a result, the locations associated with event analysis data and the locations associated with the camera/player within the current video will be consistent with each other and the game environment within the video (as per FIG. 6), and hence appear to interact naturally even though the event analysis server and the video playback apparatus may not have any explicit knowledge/model of the actual virtual environment within the game.

It will be appreciated that in principle a videogame console could operate as both a video recording apparatus and a video playback apparatus, so that a user could review their own play almost immediately with the benefit of statistical event data overlaid on top. Furthermore, a videogame console could in principle also operate as an event analysis server, for example analysing historical records of play by one user, such as a professional e-sports player, to assist them in identifying trends in their play.

Variants of Recording and Playback

Variations of the above techniques can also be envisaged.

The use of the received analysis data can vary to suit the style of the game that has been videoed. For example, providing a commentary that simply says whether a player took the popular or unpopular choice at certain points in-game may be applicable in some cases, whilst a lot of graphically complex statistics relating to the positions of multiple players may be appropriate in another game.

Similarly, the event analysis server may provide graphical data (indicator geometries, textures etc.) in response to the receive videogame identifier, so that the video playback apparatus has graphics assets to highlight events that are graphically in keeping with that particular game in the video (since the video playback apparatus may not have the game installed itself and may have no information about it or assets for it).

Whilst the description refers to use of a parallel video recording of depth data, and suggests that camera and event data etc., is also encoded within a data channel of that parallel video recording, in principle such data could be included within user data fields of a video codec that supported such fields, so that some or all of the data was directly included with the video recording of the game play. This may be an option where the videos are hosted by a non-legacy service that has been adapted to accommodate the present techniques (for example by retaining such data fields, or not applying lossy compression to them).

The techniques described herein enable the overlay of paths taken by different players (e.g. as shown in FIG. 6), and other information, on a race track or any other traversable virtual environment, using the depth buffer and in-game virtual camera positions to display these with the appropriate depth.

It will be appreciated that these techniques may facilitate the augmentation of video-recordings of game play for a number of uses. For example, graphics providing commentary and analysis may be overlaid on top of e-sports coverage.

Other examples include that a user can add a virtual object to a replay of a user's video. The virtual object may be, for example, a marker or a message in the form of a 3D callout with text. Typically, the user defines an after-the-fact in-game event for which a virtual object or graphical effect is provided.

Figure 8:
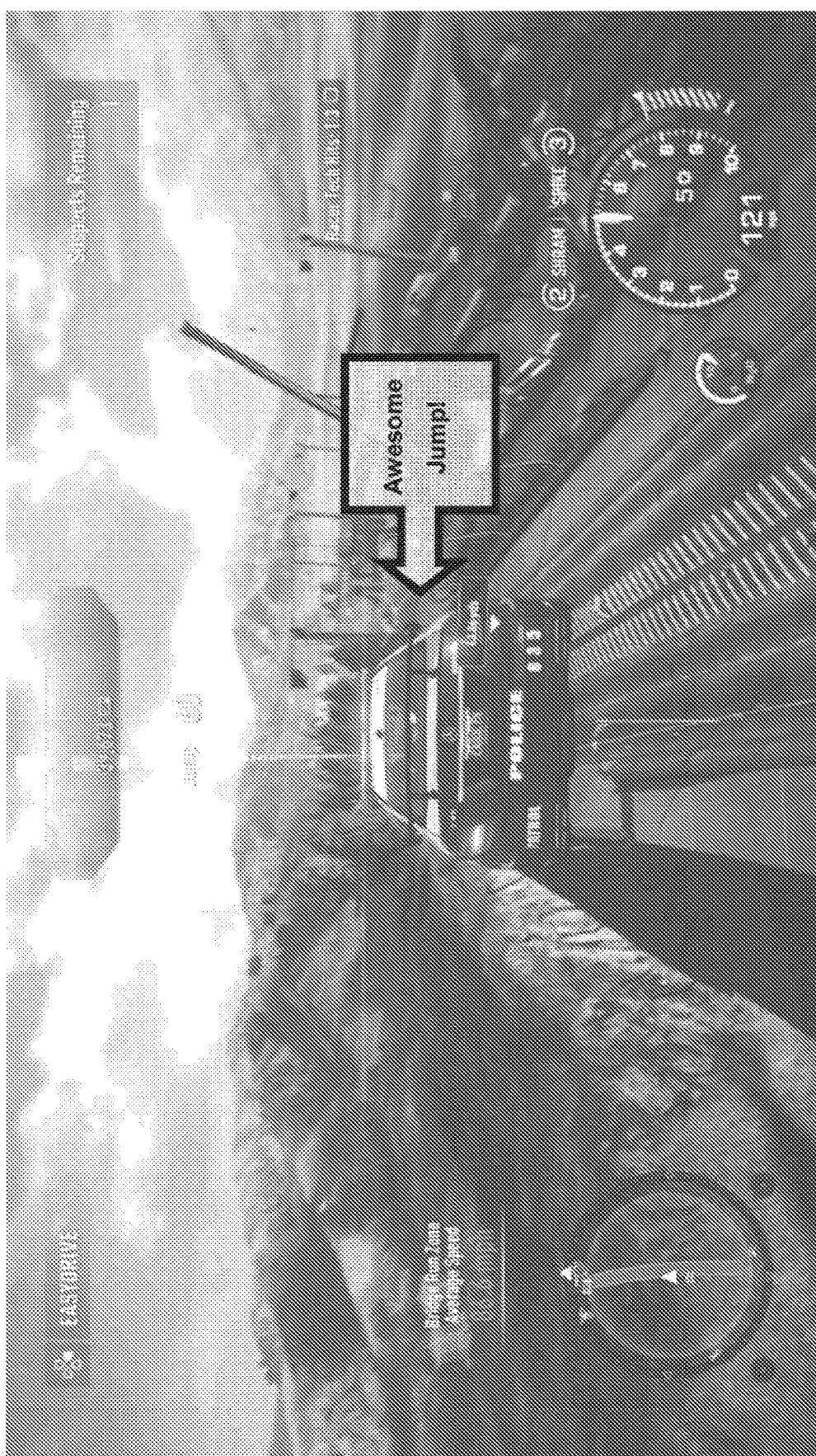
FIGS. 8 to 11 are example illustrations of possible augmentations of a video recording of gaming footage, in accordance with embodiments of the present invention.
Figure 9:

For example, on watching back a video of a player completing a race track, a viewer might leave a message like "awesome jump!" at the point where the player makes the jump, or indicating the peak height of the jump, as shown in FIG. 8. Where an object chosen to indicate such an event is itself 3D, they may thus have a position and orientation that is consistent with the environment within the video, so that they appear as if part of the originally captured footage. An example is of an arrow set by the original player or a subsequent viewer of the video that points to hidden treasure, as shown in FIG. 9.

Figure 10:

In another example, a player or viewer might have the option of displaying a 'death zone' option. The 'death zone' might appear as a shaded volume of space within the virtual environment (illustrated by a hatched area in FIG. 10), and represent the area within the map where most players are killed. During gameplay, the depth data stored in the depth video can be used to render the death zone so that it appears with the correct depth for the current view of the environment. This might be switched on by a spectator watching that player play the game (for example in e-sports).

Figure 11:

In another example, in a manner similar to that shown in relation to FIG. 6, the virtual object might be a path taken by successful players. In another example, the virtual objects could be an indicator indicating the position of e.g. enemies in the game. In yet another example, the virtual object could indicate the effective range of a weapon (seen in FIG. 11 as a colour-coded strip indicating weapon effectiveness into the distance). Spectators of e-sports might want to turn these on, for example, to see where the enemies where when a player was killed.

Hence it will be appreciated more generally that in principle whilst in-game events may be recorded during play for the purposes of augmenting the video, more generally game events and hence virtual objects or graphical effects may be associated with the recording after the recording has been generated (either offline or live), and treated in an identical fashion to in game events recorded during play as another possible augmentation data source or layer.

It will be appreciated therefore that a video viewer compatible with the parallel data sets of video, depth and camera position can calculate where to define an additional in game event (such as one of the comments, objects, or regions or other overlays noted above) within the recording, after the recording has been made and output by the original player, based on where a user chooses to place the game event within the current image; this x, y position in turn corresponds to a depth value (distance) from the camera viewpoint in the respective video image, thus allowing it to be defined with respect to the same reference point as the camera itself (e.g. in a similar manner to other in-game event data) within the associated data.

It will be appreciated that whilst reference is made herein to 'video recordings' and 'sequences of video images', these encompass both pre-recorded video (e.g. uploaded to a web-based host or streaming server) and also live video (again for example uploaded to a streaming server). In either case, the ability to augment the obtained footage is based on the combination of the video recording of the game footage and also the parallel recording of depth data and camera data.

Hence for example a streaming game service such as PS NOW® could output both colour video and depth encoding video, which could be used for rendering virtual objects within the live game. For example a second player on a local console could participate by augmenting and/or visually narrating the first player's experience.

Hardware for Recording and Playback

It will be appreciated that the methods described herein may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The hardware for the video recording apparatus may thus be a conventional computing device such as a PlayStation 4 operating under suitable software instruction, comprising a recording processor (e.g. CPU 20A operating under suitable software instruction) adapted to record a first sequence of video image output by a videogame to a video storage means (e.g. HDD 37), the recording processor being adapted (e.g. by suitable software instruction) to record a sequence of depth buffer values for a depth buffer used by the videogame, the recording processor being adapted (e.g. by suitable software instruction) to record a sequence of in-game virtual camera positions used to generate the video images, and the recording processor being adapted (e.g. by suitable software instruction) to record one or more in-game events and their respective in-game positions; a video generating processor (e.g. CPU 20A again operating under suitable software instruction) adapted to generate a second sequence of video images encoding the depth buffer value sequence; and an association processor being adapted (e.g. by suitable software instruction) to associate the in-game virtual camera position sequence with at least one of the first and second sequence of video images. In each case, the suitable software instructions implement methods and techniques described herein as appropriate.

Similarly, the hardware for the video playback apparatus may be a conventional computing device such as a PlayStation 4 operating under suitable software instruction, comprising a playback processor (e.g. CPU 20A operating under suitable software instruction) adapted to obtain a first video recording of a videogame playing session, comprising a sequence of video images, the playback processor being adapted (e.g. by suitable software instruction) to obtain a second video recording generated by encoding a depth buffer value sequence, the playback processor being adapted to obtain an in-game virtual camera position sequence that is associated with at least one of the obtained video recordings; an analysis processor adapted (e.g. CPU 20A operating under suitable software instruction) to provide an in-game virtual camera position to an event analyser, the analysis processor being adapted (e.g. by suitable software instruction) to obtain data indicative of a statistically significant in-game event and an in-game event position; a position calculation processor (e.g. CPU 20A operating under suitable software instruction) adapted to calculate a position within a current video image of the first video recording corresponding to the in-game event position, in dependence upon the associated in-game virtual camera position and decoded depth buffer values; and an augmentation processor (e.g. CPU 20A and/or GPU 20B operating under suitable software instruction) adapted to augment the current video image with a graphical representation of the statistically significant in-game event, responsive to the calculated position. Again in each case, the suitable software instructions implement methods and techniques described herein as appropriate.

Finally likewise an event analyser may be a conventional computing device such as a server or a PlayStation 4 operating under suitable software instruction, comprising a receiver (e.g. Ethernet® port 32 operating in conjunction with CPU 20A under suitable software instruction) adapted to respectively receive, from a plurality of video recording apparatuses, a videogame identifier and one or more associated in-game events and their respective in-game positions; an analysis processor (e.g. CPU 20A operating under suitable software instruction) adapted to perform an analysis on one or more aspects of the in-game events associated with a videogame identifier, and their respective in-game positions, to identify statistically significant in-game events; the receiver being adapted to subsequently receive, from a video playback apparatus, a videogame identifier and at least one of an in-game virtual camera position and an in-game player position; a selection processor (e.g. CPU 20A operating under suitable software instruction) adapted to select one or more identified statistically significant in-game events associated with the received videogame identifier and having an in-game position within a predetermined distance of at least one received position; and a transmitter (e.g. Ethernet® port 32 operating in conjunction with CPU 20A under suitable software instruction) adapted to transmit data indicative of the in-game event and its in-game position to the video playback device. Again in each case, the suitable software instructions implement methods and techniques described herein as appropriate.

As noted previously, the video recording apparatus, video playback apparatus and event analyser may be three separate devices, or maybe two separate devices in any combination, or a single device comprising all three aspects.

Consequently a system (200) may comprise the video recording apparatus as described herein, and one or more of video playback apparatus and the event analyser either as separate devices or within a single device. In principle a system may similarly comprise the video playback apparatus as described herein together with the event analyser.

It will be appreciated that using the above techniques and apparatus, a facility is provided wherein users can record their own gameplay and upload it to publicly accessible hosts such as YouTube® and Twitch® (or potentially a proprietary host such as one belonging to the administrator of a network associated with a type of videogame console), and subsequently viewers of that video, using a device or application implementing as applicable the techniques described herein, can watch the video of the user playing the game that is augmented with information relating to how other players played the game, thereby creating a context for the users decisions, successes and failures within the game, and a more rich viewing experience.

2D Mapping

As described previously herein, a useful source of information for both the player of the game and potentially the watcher of a video recording of that game is a map relating to the users experience of the game or similarly the video recording of the game.

Figure 12:
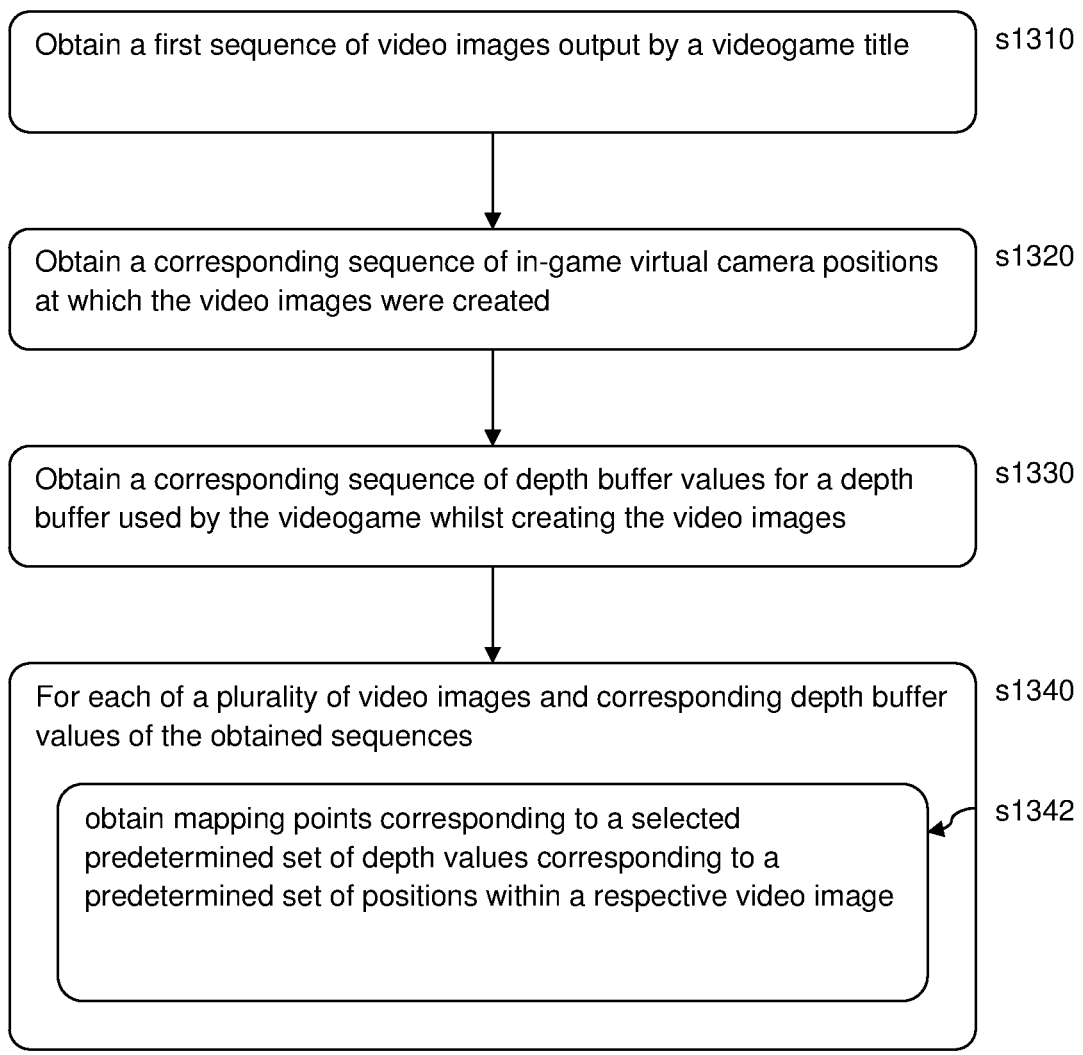
FIG. 12 is a flow diagram of a method of mapping a virtual environment in accordance with embodiments of the present invention.

Turning now to FIG. 12, to address or mitigate this issue, a method of mapping a virtual environment (such as the game environments illustrated in FIGS. 4A, 6, 8, and 9-11), comprises:

In a first step s1310, obtaining a first sequence of video images output by a videogame title, for example as described previously herein either by accessing image data directly from the entertainment device while running a game, or from a video recording thereof, generated as described herein.

In a second step s1320, obtaining a corresponding sequence of in-game virtual camera positions at which the video images were created, for example as described previously herein either by accessing the relevant data directly from the entertainment device while running a game, or from a video recording of the output images thereof, or from data associated with the video recording, or from data embedded in a separate video recording also comprising depth information, or any other suitable means that serves to associate the virtual camera position with the corresponding video image.

In a third step s1330, obtaining a corresponding sequence of depth buffer values for a depth buffer used by the videogame whilst creating the video images, for example as described previously herein either by accessing the relevant depth buffer data directly from the entertainment device while running a game, or from data associated with a video recording of the output images thereof, for example in the form of a separate data file or second video recording that serves to encode the depth data using any appropriate techniques such as those described herein.

Then in a fourth step s1340, for each of a plurality of video images and corresponding depth buffer values of the obtained sequences, a sub-step s1342 comprises obtaining mapping points corresponding to a selected predetermined set of depth values corresponding to a predetermined set of positions within a respective video image; wherein for each pair of depth values and video image positions, a mapping point has a distance from the virtual camera position based upon the depth value, and a position based upon the relative positions of the virtual camera and the respective video image position.

Mapping points may be obtained by calculating a map position corresponding to the distance and direction of the map point, with the direction being based upon the difference between the optical centre of the virtual camera and a respective selected position within a video image, and the distance being based upon the virtual camera position and the depth value corresponding to the selected position within the video image.

Figure 13A:
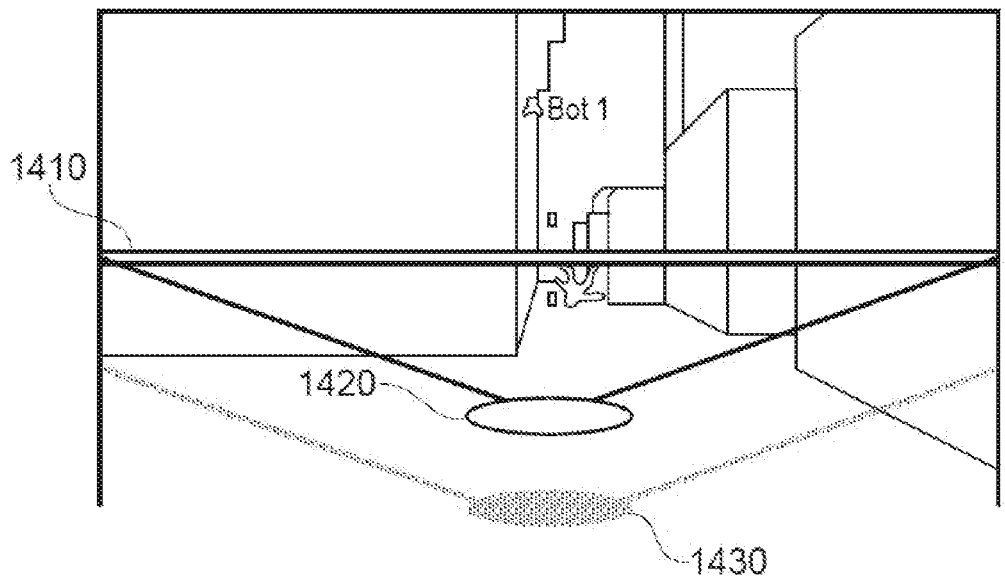
FIGS. 13A and B illustrate the process of obtaining depth information for a predetermined set of points in a video image, in accordance with embodiments of the present invention.
Figure 13B:
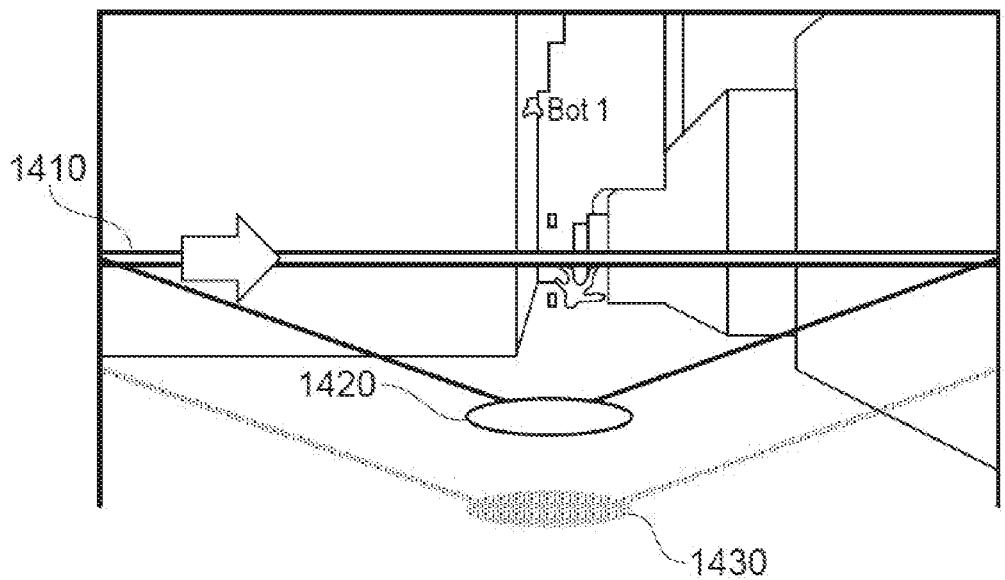
FIG. 13C illustrates mapping points in a map space in accordance with embodiments of the present invention.
Figure 13C:
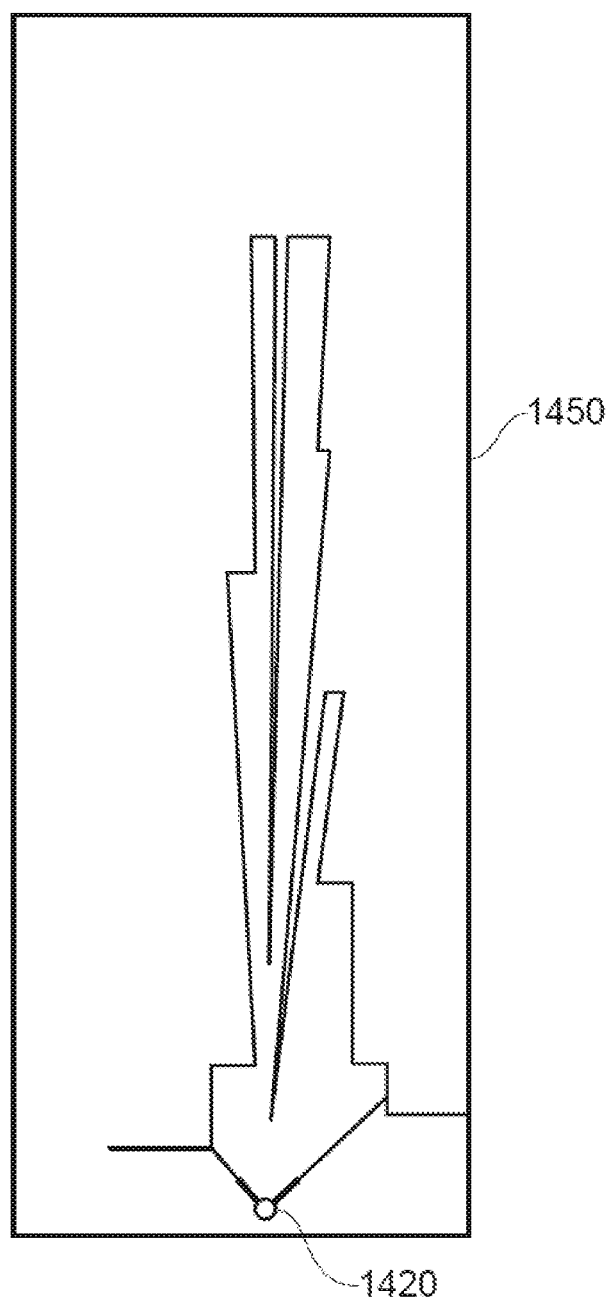

FIGS. 13A-C illustrates process for a predetermined set of positions comprising the pixels of the centreline of an image. In FIG. 13A, greyscale image elements, if shown, would correspond to depth values with more distant values being darker. It will be appreciated that the precise nature of these elements is not important to an understanding of the invention. For example, if shown according to a different convention, then the closest depth values (e.g. a value of zero) may appear darkest. As noted above, the predetermined set of positions 1410 is a set of pixels along the centreline of the image. The set may sample all or a subset of pixels, and hence for example may comprise every N pixels, where N may, as a non-limiting example, be 1, 2, 3, . . . 10, etc.

The upper circle 1420 indicates the current virtual camera position, and the lower circle 1430 indicates the virtual camera position in the case of a 2D mapping (e.g. with elevation set to zero, or equivalently subtracting the current level of the virtual ground at the location of the virtual camera). In this example, the field of view of the virtual camera is indicated by the angle between the two lines emanating from each of the circles.

As shown in FIG. 13B, the corresponding depth value for each pixel in the predetermined set is obtained. It will be appreciated that where the resolution of the depth value information is less than the image resolution, then a regular sampling every N pixels corresponding to the effective resolution of the depth information may be used instead.

As shown in FIG. 13C, the map points may then be identified in a map space 1450, based upon the relative position of the sample pixel within the image and the position of the virtual camera, together with the obtained depth value.

Typically the map is generated with respect to the origin of an in-game coordinate system. Consequently, a map point may be calculated for the map based on the position of the virtual camera in the game coordinate system together with the distance and direction from the virtual camera as indicated by the depth value and the pixel position within the image captured by the virtual camera.

The calculated direction may further take account of the field of view of the virtual camera. Virtual cameras with different fields of view may result in the same pixel position within an image corresponding to a different angle away from the optical axis of the virtual camera. Alternatively, the field of view may be fixed or assumed, and/or the effect of the field of view imposes a scaling factor within the calculations that can be ignored for the purposes of generating a map.

Similarly the calculated direction may further take account of the orientation of the virtual camera, so that the apparent direction of the sample pixel with respect to the optical axis of the virtual camera is added to the direction of the optical axis of the camera itself. In this case, the orientation of the virtual camera may be obtained together with the position of the virtual camera. Again however, for certain games the orientation of the virtual camera may be fixed or assumed, and so no additional data or calculation may be required to account for it.

In any case, a map point is effectively projected from the viewpoint of the virtual camera in a direction indicated by the selected image pixel, and by distance indicated by the corresponding depth data, and located within the in-game coordinate system on the map space.

Consequently, over the course of successive images, a map dataset of mapping points (a point cloud dataset) corresponding to the first sequence of video images is obtained.

It will be appreciated that the image data, depth data, virtual camera position, orientation, and field-of-view, data may be obtained directly from the game whilst being run, or may be obtained from encoded data associated with a video recording of the game, as encoded using any of the techniques described herein. Hence a map dataset can be obtained by calculating map points whilst playing the game, or during playback of video according to the techniques described herein.

It will also be appreciated, as described herein below, that a map dataset may similarly be recorded in association with a video recording of a game, using any of the techniques described herein, so that a playback device does not have to calculate the map points itself.

As described above, one predetermined set of sample positions within the respective video image comprises the centreline of the image, which typically intersects the optical axis of the virtual camera. However more generally a predetermined set of positions may comprise a sampling along one or more horizontal lines of pixels in the image, such as for example the centreline and positions and predetermined distances or proportions above and below the centreline or (if centreline is not used) at predetermined positions or proportions with respect to the top or bottom of the image.

Hence for example horizontal line 25% up from the bottom of the image is likely to capture the features of the terrain that may not be included in the centreline. Meanwhile a horizontal line 75% up from the bottom of the image may capture relevant aerial features or other features that may be expected from a top-down view of a map for example, a centreline may intersect with the trunk of a tree, but not with the branches/canopy of a tree, which a user may expect to see in a map).

Where multiple horizontal lines are used to sample the image, the absolute, relative or rank height of the horizontal lines may be associated with the resulting map points. Consequently where map points are generated at the same position within the map space, optionally only the map point associated with the absolute, relative or rank highest horizontal line may be retained. Alternatively, multiple map points at the same position may be retained if they have different absolute, relative or rank heights.

Alternatively or in addition, one predetermined set of sample positions within the respective video image comprises a sampling distribution positions over the area of the video image. Hence for example a regular array of pixels may be sampled (for example every Nth pixel horizontally, and every Mth pixel vertically, where N may be as described previously and M may be similar). Clearly where the depth information is of a lower resolution than the pixel resolution, then the sampling may select pixels at an effective resolution corresponding to that of the depth information.

In this case, a point cloud may be generated for the image frame within the map space, with the direction of mapping points having an elevation as well as a left/right direction relative to the optical axis of the videogame. Consequently, a 3D representation of the map may be generated within the. Such a map may still be presented in 2D if desired (i.e. ignoring elevation information), but alternatively the point cloud may be used as the basis for rendering a 3D approximation of the mapped area.

Alternatively or in addition, the highest elevation value in the point cloud within a predetermined 2D area of the map may be stored in association with the map point to give a height value, in a similar manner to that described above for sampling over multiple horizontal lines.

Additional information that may be included in a map dataset includes the successive positions of the virtual video camera (for example in the case of a first-person perspective game) and/or the position of a user's avatar (for example in the case of a third-person perspective game), so that a trace of the user's position within the map can also be recorded.

In an embodiment of the present invention, a further step comprises obtaining colour information at the predetermined set of positions within the respective video image, and associating the obtained colour information with the corresponding generated mapping points.

In other words, points on the map may be associated with the same colour as the corresponding point within the videogame environment, enabling a subsequent graphical display of the map to resemble the videogame environment as if from a reduced scale top-down perspective.

To assist with this process, and referring again to FIG. 13C, it will be appreciated that not merely mapping points may be associated with, at the corresponding point on screen, but also points along the lines of projection from the optical axis of the virtual camera to the mapping points (which as described previously herein may be calculated based on the camera position, depth information, and direction of view from the camera through the sample point to the virtual environment). Hence with reference to FIG. 13C, whilst the map points represent the points of termination of lines having links corresponding to the depth information on the image, and directions corresponding to the relative position of the sample pixel on screen and the virtual camera optical axis, as described above, the lines emanating from the virtual camera position 1420, it will be appreciated that colour information for points along those lines will also be available because they each represent a clear line of sight between the camera and the termination point, and colour information for the corresponding position of any displayed surface beneath those lines can be sampled for each corresponding position within the map (for example per map-pixel, or every P map-pixels, where P may be 1, 2, 3, . . . 10 etc).

In this way, the colour of unobscured the terrain visible at the current virtual camera position may be sampled and used to colour the map.

It will also be appreciated that use of a horizontal line place of a suitable position below the centreline of the image, and/or the use of a sample distribution over the area of the image, or more generally sampling lines of sight that are not parallel to the angle of the virtual terrain but instead converge with it at some point, will result in lines of sight terminating on the ground/terrain of the virtual environment. Therefore, in the circumstances capturing colour information at the point of termination alone can be sufficient to populate the map with colour information relating to the terrain, as well as potentially elevated features such as buildings, trees etc.

It will be appreciated therefore that the map may comprise multiple types of data, including mapping points data indicating points of termination of lines of sight from the virtual camera taken through the predetermined set of sample positions, and optionally simple colour data for visible components of the terrain beneath those lines of sight, and/or similarly optionally colour data associated with the mapping points themselves.

As described above, the resulting stored colour information then allows the generation of a map or map interface that resembles the environment seen in the game, because it effectively samples the rendered textures of the displayed environment and stores these at corresponding positions within the map data.

It will be appreciated that whilst this information may be used by a videogame itself to generate a map that reflects the user's individual and potentially unique journey within the game for display during gameplay, potentially the mapping points, and more generally a map dataset comprising such mapping points and optionally any colour information as described herein, may be recorded in association with a recording of the videogame images of the kind described previously herein.

Hence in an embodiment of the present invention, the mapping method comprises the steps of recording the first sequence of video images output by the videogame, using any of the techniques described herein; recording the corresponding sequence of in-game virtual camera positions used to create the video images, using any of the techniques described herein; recording the corresponding sequence of depth buffer values for a depth buffer used by the videogame whilst creating the video images, using any of the techniques described herein; and recording the mapping points, again using any of the techniques described herein with respect to ancillary data such as event data, camera data and the like, and associating the sequences of in game virtual camera positions, depth buffer values and the mapping points with the recording of the first sequence of video images, again as described previously herein.

As described previously, one of the techniques for recording depth buffer values comprises generating a second sequence of video images encoding the depth buffer value sequence. As described previously, the second sequence of video images can accommodate corresponding ancillary data such as virtual video camera information including a position and optionally orientation, event data, and/or, it will be appreciated, mapping points, mapping point elevation information, mapping point colour information (and/or simply map colour information) and the like.

However it will be appreciated that any of the previously described techniques, such as use of a separate data file associated with the recording of the first sequence of video images, may be used instead.

It will also be appreciated that a map dataset comprising mapping points, and optionally mapping point elevation information, mapping point colour information and/or simply map colour information may be generated during a single instance of play (e.g. in direct association with a video sequence corresponding to that instance of play), but may alternatively or in addition be stored either locally with the entertainment device, or remotely at a server, so that successive instances of play may add to the this map dataset, creating a cumulative record of the user's exploration of the virtual environment that extends beyond a single instance of play.

It is possible to combine mappings obtained from individual instances of play because they share a common in game coordinate system.

It will be appreciated this is also true whether the individual instances of play come from the same user, or from the same entertainment device. Hence in an embodiment of the present invention, map datasets from multiple users may be combined, optionally with mapping points or more generally map data points other than null or unpopulated points being associated with a given user, so that multiple maps that may occasionally cross or overlap can be disambiguated by user.

In this way for example a user may compare his or her map with those of their friends, and see where different friends had shared or unique experiences.

Similarly in this way an entertainment device or server may compile a more complete map of an environment that may otherwise not be easy to map, for example if the environment is procedurally generated, by aggregating map datasets generated by a plurality of explorers of that environment.

Hence the mapping method may comprise obtaining one or more additional map datasets generated using a sequence of video images, virtual camera positions and depth buffer values originating from a separate instance of the same videogame. In this case, 'separate instance' may equally mean a separate instance of playing the videogame on the same device by the same user, a separate instance of playing the videogame on the same device by a different user, or a separate instance of playing the videogame on a different device (by any user). Clearly 'the videogame' itself may be a different installation of the same videogame title, when played on different devices.

It is then possible to generate a graphical representation of some or all of the mapping points of at least a first map dataset, for example for output by the videogame.

The description above discusses the creation of the map dataset and more generally the mapping data points used by the map dataset using images, depth information, camera information and optionally other information such as colour information obtained directly from the videogame itself. However it will be appreciated that, as described herein, video images from the game, together with depth information, camera information and optionally other information can be recorded for subsequent playback independent of the source videogame itself, using one of a number of techniques as described herein.

Consequently, it will be understood that the steps of obtaining a first sequence of video images output by a videogame title (s1310), obtaining a corresponding sequence of in-game virtual camera positions at which the video images were created (s1320), and obtaining a corresponding sequence of depth buffer values for a depth buffer used by the videogame whilst creating the video images (s1330) can all be achieved by retrieving this information from a video recording of the video game images and associated files (such as a second video recording encoding depth information and other ancillary data, as described herein).

Consequently the sequence of video images can be obtained from a first video recording with which the corresponding virtual camera positions and sequence of depth buffer values are associated. Typically but not necessarily, as described herein, the corresponding sequence of depth buffer values is obtained from a second video recording that was generated by encoding the sequence of depth buffer values.

Hence it is possible for a playback device using this recorded information to similarly obtain mapping points using this data, and to construct an equivalent map dataset, by calculating them from the image, depth, and camera data as described previously herein. The playback device can then augment replay of the recorded information with map data, or present it separately.

Alternatively or in addition, also as described previously herein, an entertainment device may record a mapping dataset, comprising mapping points and optionally elevation data, colour data and the like as described previously; or more generally may simply record mapping points, as ancillary data similar to event data or camera data, using any suitable technique described herein, so that the data is associated either with the first video recording comprising the sequence of video images, or optionally a second video recording comprising the sequence of depth buffer values, typically by being encoded within one of these videos.

In this way, advantageously the mapping points or map datasets can be included in such a manner that the playback device can access mapping points, and optionally elevation data, colour data etc., for at least part of the map corresponding to image data that has not yet been displayed (i.e. as well as map information corresponding to the current position being shown in the video, access map information that would otherwise need image/depth/camera information for positons ahead of—or behind—that current position).

Consequently are played device can generate at least part of a map comprising a graphical representation of some or all of the mapping points of at least a first map dataset for display with the first video recording, with parts of the map potentially corresponding to scenes not yet displayed in the video.

By displaying some or all of a map that in effect summarises the scenes in the video recording, it becomes possible to use that map as a user interface for control of the video recording.

For example, in a video recording of a journey from a start point A to an end point B, the map will resemble a path following the camera position shown to the user during that journey.

Consequently, by use of a suitable user interface such as a mouse pointer, slider or reticule controlled by a joystick, a position on the displayed map can be selected. And this meant position can act as a proxy for a desired position within the video playback.

As a result it is possible to control a playback position of the first video recording by selecting a video frame whose corresponding camera position is closest to the selected position on the displayed map.

In this way, for example, a user can download a video of the journey from a start point A to an end point B, and be presented with a map summarising the journey (either as an initial interface, or as an overlay optionally superposed or placed alongside the video playback); the user can then click on points in the map and playback will jump to the corresponding part of the video recording.

Similarly, the current camera position associated with a given displayed video frame can be shown on the map, so that a viewer of the video can easily relate what they are seeing to a location on the map. This can also assist the user to navigate through playback of the video, for example if more conventional fast forward or rewind controls are used instead of or as well as directly interacting with the map.

As was discussed previously, map dataset from multiple instances of gameplay can be combined. Accordingly, whilst playback of the current video may use map data associated with that video, map datasets from other instances of gameplay can also be accessed (for example from a central server). Typical map datasets to access may be won by the same user, but with a different score or other measurable achievement, or those of friends of the player in the current video who also play the game, or friends of the viewer of the current video who also play the game, or of other players identified as being of likely interest to the viewer, such as a player at the top of a local, regional, or global leaderboard for the game, or a player who has event data within their recordings that is different to event data within the current video recording (for example, in a race presently displayed video does not have an associated crash event near the current displayed position, but another video does have an associated crash event near the current displayed position).

A graphical display of at least part of a map for a map dataset from one or more of these additional players or play instances may be readily included in conjunction with the map for the current video, because the mapping points share the same in-game coordinate system.

Hence the mapping method may comprise the steps of generating a at least part of a first map comprising a graphical representation of some or all of the mapping points of at least a first map dataset for display with the first video recording, and generating a at least part of a second map comprising a graphical representation of some or all of the mapping points of at least a second map dataset associated with a different video recording of a different sequence of video images output by the same videogame title and sharing the same in-game co-ordinate system, displaying at least part of the first map during playback of the first video recording, the displayed part encompassing at least the current virtual camera position associated with the displayed video image, and displaying at least part of the second map during playback of the first video recording if the respective part of the second map is within a predetermined range of the current virtual camera position in the in-game co-ordinate system.

In this way, the viewer of a current video can see separate maps (e.g. different meandering tracks corresponding to player movement in different videos) appear when gameplay depicted in another available video occurs in the same or similar areas of the virtual game environment to those of the current video.

Subsequently, in an embodiment of the present invention, the playback device may detect whether a user interacts with a displayed part of the second map, and if so, switch to playback of the corresponding second video.

In this way, a viewer can navigate the virtual environment from the perspective of different players, by hopping between videos when maps corresponding to those videos suggest that the videos show scenes from the virtual environment that are within a threshold proximity of each other.

The user's interaction with the second map may be similar to their interaction with the first map, namely that the second video starts at a frame whose virtual camera position best corresponds to the position selected on the second map. Alternatively or in addition, a user may indicate a desire to switch video streams at the point of closest proximity between mapping points on the two maps, or between virtual camera positions on the two maps. Hence for example the user may indicate a desire to switch video streams when mapping points or camera positions substantially intersect (i.e. as the respective players in the videos cross paths).

This gives a viewer the freedom to browse through video recordings of the game environment, by hopping on to recordings of different players at corresponding places in their respective in-game journeys.

As noted previously herein, maps and by extension video recordings may be chosen from a broader corpus of material based on any reasonable criteria, such as video recordings made by friends of the viewer or friends of the original player, or video recordings made by player with the highest rankings, or video recordings having the most 'likes' or other indications of viewer, approval and the like.

One possibility is for a group of players within a multi-player on-line game to each record their own perspective of the game, and to have these videos associated as a group. Subsequently, using the techniques described herein, these videos can be viewed according to rules suitable for generating a narrative of a group story. Hence for example in a death match game where two players come together so that the maps of their two videos intersect, if one of the players kills the other, then if a user is watching a video of the victorious player, the video continues, whereas if a user is watching a video of the vanquished player, then the video switches to that of the victorious player at a point where they respective camera positions of the two players is that their closest, optionally after the killing event. In this case, for example, event information is also encoded to indicate the nature of such interactions. In a similar manner, in a racing game the video playback could switch to anyone who overtakes the current leader, for example.

As was noted previously herein, it will be appreciated that the methods described herein may be carried out on conventional hardware suitably adapted as applicable by software instruction or by the inclusion or substitution of dedicated hardware. Thus the required adaptation to existing parts of a conventional equivalent device may be implemented in the form of a computer program product comprising processor implementable instructions, stored or conveyed by any suitable means, as discussed previously.

Hence for example the hardware for an entertainment device operable to implement the mapping techniques described herein may be a conventional computing device such as a PlayStation 4 operating under suitable software instruction, comprising a video data processor (such as CPU 20A and/or GPU 20B) configured (for example by suitable software instruction) to obtain a first sequence of video images output by a videogame title; a camera position data processor (such as CPU 20A and/or GPU 20B) configured (for example by suitable software instruction) to obtain a corresponding sequence of in-game virtual camera positions at which the video images were created; a depth data processor (such as CPU 20A and/or GPU 20B) configured (for example by suitable software instruction) to obtain a corresponding sequence of depth buffer values for a depth buffer used by the videogame whilst creating the video images; and a mapping data processor (such as CPU 20A and/or GPU 20B) configured (for example by suitable software instruction), for each of a plurality of video images and corresponding depth buffer values of the obtained sequences, to obtain mapping points corresponding to a selected predetermined set of depth values corresponding to a predetermined set of positions within a respective video image; wherein for each pair of depth values and video image positions, a mapping point has a distance from the virtual camera position based upon the depth value, and a position based upon the relative positions of the virtual camera and the respective video image position, thereby obtaining a map dataset of mapping points corresponding to the first sequence of video images.

It will be apparent to a person skilled in the art that variations in the above hardware corresponding to the various techniques as described and claimed herein are considered within the scope of the present invention, including but not limited to:

the predetermined set of positions comprising pixels sampled from one or more horizontal lines across the respective image;

the predetermined set of positions comprising a sampling distribution of positions over the area of the video image;

a colour processor (such as CPU 20A and/or GPU 20B) configured to obtain colour information at the predetermined set of positions within the respective video image, and associate the colour information with the corresponding generated mapping points;

hardware as described previously herein adapted to record the first sequence of video images output by the videogame, record the corresponding sequence of in-game virtual camera positions used to create the video images, record the corresponding sequence of depth buffer values for a depth buffer used by the videogame whilst creating the video images (for example by generating a second sequence of video images encoding the depth buffer value sequence), and record the mapping points (and optionally mapping colour data, elevation data and the like), and to associate the sequences of in game virtual camera positions, depth buffer values and the mapping points with the recording of the first sequence of video images;

a map processor (such as CPU 20A and/or GPU 20B operating under suitable software instruction) configured to obtain one or more additional map datasets generated using a sequence of video images, virtual camera positions and depth buffer values originating from a separate instance of the same videogame;

a graphical output processor (such as CPU 20A and/or GPU 20B operating under suitable software instruction) configured to generate a graphical representation of some or all of the mapping points of at least a first map dataset, for output by the videogame;

the sequence of video images being obtained from a first video recording, with which the corresponding virtual camera positions and sequence of depth buffer values are associated;

the corresponding sequence of depth buffer values being obtained from a second video recording that was generated by encoding the sequence of depth buffer values;

the mapping points being obtained from data associated with a first video recording comprising the sequence of video images, or a second video recording comprising the sequence of depth buffer values;

a map interface processor (such as CPU 20A and/or GPU 20B operating under suitable software instruction) configured to generate a at least part of a map comprising a graphical representation of some or all of the mapping points of at least a first map dataset for display with the first video recording, select a position on the displayed map using a user interface, and control a playback position of the first video recording by selecting a video frame whose corresponding camera position is closest to the selected position on the displayed map;

a map interface processor (such as CPU 20A and/or GPU 20B operating under suitable software instruction) configured to generate a at least part of a first map comprising a graphical representation of some or all of the mapping points of at least a first map dataset for display with the first video recording, generate a at least part of a second map comprising a graphical representation of some or all of the mapping points of at least a second map dataset associated with a different video recording of a different sequence of video images output by the same videogame title and sharing the same in-game co-ordinate system, display at least part of the first map during playback of the first video recording, the displayed part encompassing at least the current virtual camera position associated with the displayed video image, and display at least part of the second map during playback of the first video recording if the respective part of the second map is within a predetermined range of the current virtual camera position in the in-game co-ordinate system; and the map interface processor being configured to detect whether a user interacts with a displayed part of the second map, and if so, switch to playback of the corresponding second video.

3D Mapping

Building on the above principles, it is also possible to generate a 3D map (e.g. comprising elevation data to form at least a partial reconstruction of the mapped environment) from the gameplay of one or more users.

As discussed previously, a game typically generates an image (RGB) buffer at the game resolution; typically 1280× 720 pixels, or 1920×1080 pixels, or any other common resolution format. The colour information per pixel may in turn be 24 bits (8 bits per colour channel), for example. The game typically also generates a depth buffer, typically at the same resolution as the image buffer (though optionally at a lower resolution, and relying on interpolation). The depth data per 'pixel' may for example be 16 bits, as discussed previously.

In addition, for each image frame, the virtual camera position and orientation may be captured, and optionally also the field of view if this is variable (for example when using an in-game sniper scope, or experiencing an in-game health effect that limits vision).

Optionally also events and in-game entities may be recorded as discussed previously. Information for recorded entities (such as non-player characters, or opponents) may include their position, orientation, type, group/class (e.g. team A or B, the player or an NPC), and/or an instance identifier. Optionally this information may be used to identify where a temporary/transitional object is captured in the image, so that it can be subsequently removed from the mapping process.

As was described previously herein in relation to the 2D map, a set of transformations transcribe 3D points within the game world to 2D points within the captured image, according to a standard pipeline for such games. These typically include transforming co-ordinates of elements in the game environment through a camera matrix (or 'view matrix'), and typically also through a perspective projection matrix (or 'clip matrix'). Other transforms may also be performed, for example placing local model co-ordinates within a world co-ordinate system as a preparatory step.

Consequently, referring to the previously described techniques for mapping a virtual environment, the steps comprise obtaining a first sequence of video images output by a videogame title, obtaining a corresponding sequence of in-game virtual camera positions at which the video images were created, obtaining a corresponding sequence of depth buffer values for a depth buffer used by the videogame whilst creating the video images, and for each of a plurality of video images and corresponding depth buffer values of the obtained sequences, obtain mapping points corresponding to a sampling distribution of points over the area of a respective video image and their associated depth values; wherein respective mapping points are obtained by projecting co-ordinated derived from the sample points from the video image and associated depth values back into a 3D game world co-ordinate system of the videogame title; thereby obtaining a point cloud dataset of mapping points corresponding to the first sequence of video images.

In this case, a sampling distribution of positions over the area of the video image corresponds to the predetermined set of positions within a respective video image. The sampling may be 1:1 (i.e. all pixels of the video image) or a sub-sampling, such as 1:2 (i.e. a chequerboard) or 1:4 (e.g. one pixel per 2×2 block of pixels). Conversely pixels may be interpolated to increase effective resolution (super-sampling). Other sampling distributions may be similarly considered, such as a random sample distribution, or a Gaussian sample distribution centred on the image centre.

Figure 14:
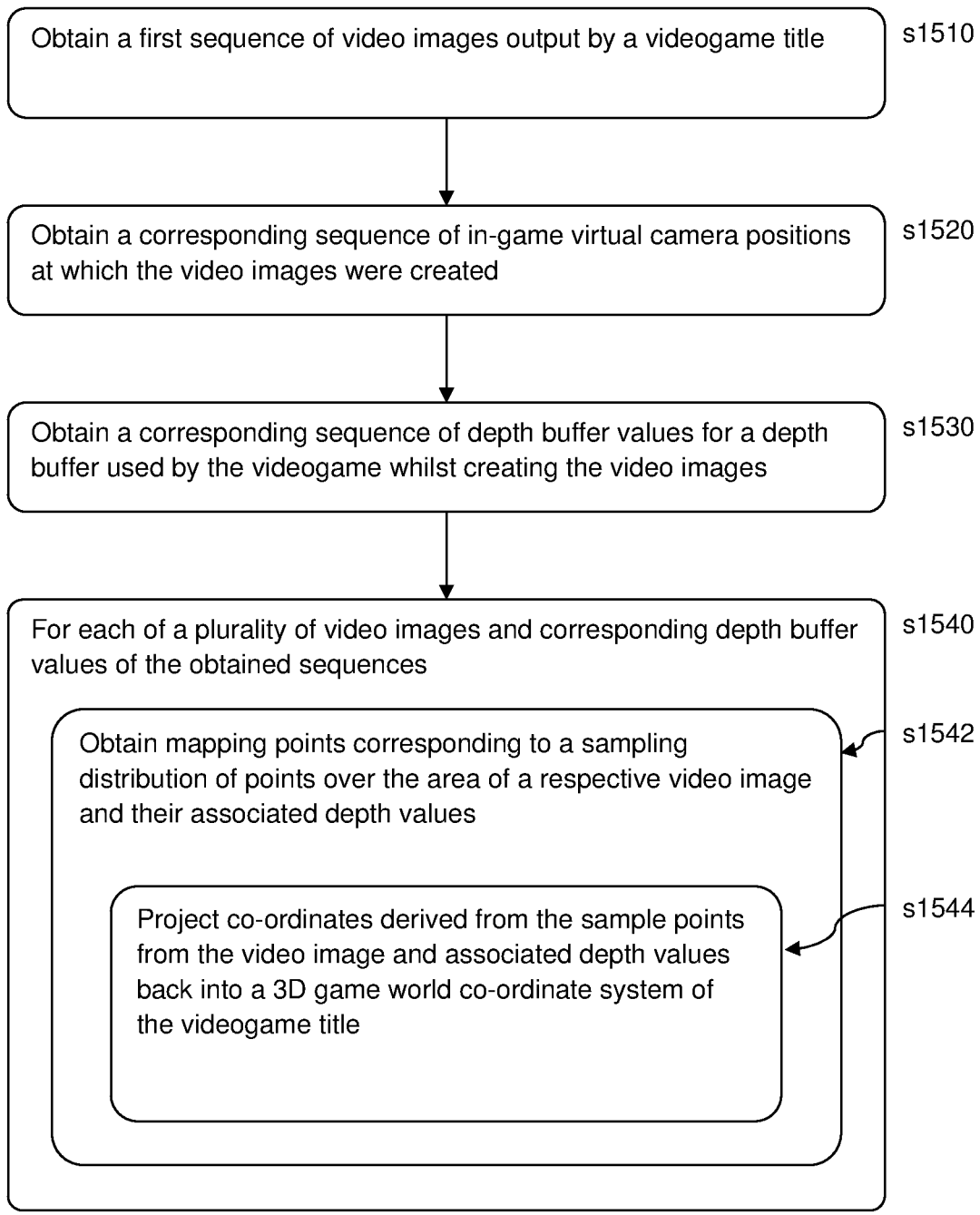
FIG. 14 is a flow diagram of a method of mapping a virtual environment in accordance with embodiments of the present invention.

Hence referring now to FIG. 14, the 3D mapping technique can be seen as a variant on the method of FIG. 12, and comprises:

in a first step s1510, obtaining a first sequence of video images output by a videogame title;

In a second step s1520, obtaining a corresponding sequence of in-game virtual camera positions at which the video images were created;

In a third step s1530, obtaining a corresponding sequence of depth buffer values for a depth buffer used by the videogame whilst creating the video images;

Then in a fourth step s1540, for each of a plurality of video images and corresponding depth buffer values of the obtained sequences, a sub-step s1542 of obtaining mapping points corresponding to a sampling distribution of points over the area of a respective video image and their associated depth values.

As noted above, these are obtained in a further sub-step s1544 by projecting co-ordinates derived from the sample points from the video image and associated depth values back into a 3D game world co-ordinate system of the videogame title, thereby obtaining a point cloud dataset of mapping points corresponding to the first sequence of video images.

In an embodiment of the present invention, in relation to sub-step s1544 then given the set of points and the depth information (sampled, sub-sampled or interpolated as appropriate) the 3D-to-2D transforms used to create the output image can be reversed to reconstruct the 3D points, for example in the game world co-ordinate system. Hence an inverse perspective projection matrix may be applied, followed by an inverse camera matrix, to arrive at a set of data points within the world co-ordinate system. Hence projecting sample points from the video image back into a 3D game world co-ordinate system may comprise transforming co-ordinates output by an inverse perspective projection matrix through an inverse camera matrix. Similarly, projecting sample points from the video image back into a 3D game world co-ordinate system may comprise transforming co-ordinates output by an inverse perspective projection matrix through an inverse camera matrix.

Figure 15:
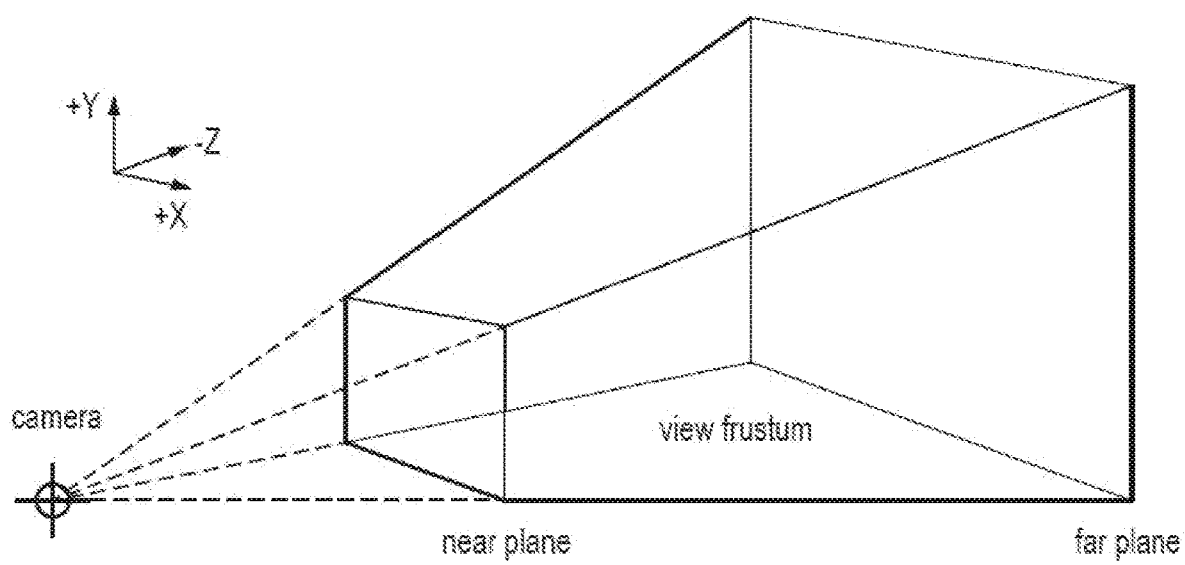
FIG. 15 illustrates mapping points in a map space in accordance with embodiments of the present invention.

Alternatively or in addition, in relation to sub-step s1544, then with reference to FIG. 15 then in an embodiment of the present invention is it appreciated that the view in the image fills a view frustum in the game world, resembling an expanding wedge of space. As a result, all points in the image can be thought to lie on lines of projection within this frustrum.

Accordingly, 3D points can be generated very quickly by interpolating a position between a near-image plane and a far-image plane (defining the frustum) using the associated depth values. The values of 'near' and 'far' may be predetermined. Typically the near and far image planes are set to encompass the full range of depth values and so are located at positions corresponding to a depth value of '1' and '65535' (for a 16 bit depth). Alternatively, the near and far image planes may be set at positions corresponding to the closest and furthest actual depth values within a given depth image.

Optionally, the inverse projection techniques described above may be used to project the near and/or far image planes for this purpose.

In other words, the x,y,z position of a point sampled from the image will be at a position along a line between that sample point position in the near image plane, and the sample point position in the far image plane, the position along the line being proportional to the depth data associated with that sample point.

Optionally, this process of frustum point gathering may initially assume the virtual camera is at the game world origin, and then transpose the resulting 3D points within the world co-ordinate system according to the virtual camera position/orientation information.

Hence using either technique, the sample points of the 2D video image output by a videogame are projected back into the 3D game world co-ordinate system (e.g. a co-ordinate system consistent with the 3D game world co-ordinate system within the game, and within which a map of the game world can be assembled) to create mapping points. The origin, scale or other aspects of the co-ordinate system are not essential, providing the projection into that co-ordinate system is performed consistently, but clearly it is preferable to have a 1:1 correlation between the in-game world co-ordinate system and the generated map.

The result is a 3D point cloud representation of the game environment as seen in the video image.

Over successive images in a video sequence, additional sets of mapping points are created, adding to the 3D point cloud representation of the game environment within the game world co-ordinate system, to form a point cloud dataset of mapping points.

In this way, a point cloud representation of the parts of the game environment seen by the user during play is built up through analysis of successive output video images.

Optionally, points in the 3D point cloud can be snapped to a notional grid (i.e. a 3D or volumetric grid). The resolution of this grid (i.e. the pitch size) may be equal to a cube having sides the size of a single pixel within the game environment at the near image plane used when frustum point gathering, or conversely the far image plane, representing a unit volume of the grid. This may be useful for example where the calculated position of a point using either of the 2D to 3D projection techniques described above results in a point having a very precise location value that in effect occupies an arbitrary position within a unit volume of the notional grid. Hence the potential change of position of a given point may be in this case small, but serves to regularise point positions and, as explained below, simplify the identification of subsequent co-located points.

Alternatively the grid may have a unit volume of a size comparable to the scale of the environment within the game world. Hence the grid may equate for example to a 1×1 cm cube or a 10×10 cm cube for game environments with a lot of detail, for example indoors, or a 1×1 m cube or a 10×10 m cube for large environments, or a 100×100 m cube 1 km×1 km cube or more, for example for a space-based game surveying planets.

Optionally, by virtue of the common game world coordinate system used to define the position of a 3D point, point clouds derived from output video images of multiple game instances (either by the same user over successive plays, and/or from multiple users) may be combined to form a more complete point cloud representation of the game environment.

Merging point clouds from successive video images within the sequence of video images output by a videogame title, typically within a single gaming session, but optionally within successive sessions of the user and/or sessions from several users, can benefit from some data sanitisation.

As noted above, snapping the projected points to a 3D grid makes it simpler to compare co-located points originating from different image frames.

Co-located points can be culled down to 1 point in a grid unit, and/or points can be combined using an appropriate data format (kd-tree, octree or the like).

Points that only appear in than a predetermined number of contiguous image frames or fewer may be culled; these can be assumed to represent moving entities whose position changes during the course the game, and so do not necessarily represent the feature of the map environment. The predetermined number may be anything from one up to the number of frames generated in a second, two seconds, or more, or may be a variable value based upon the relative velocity of the virtual camera (with a smaller number when the camera is fast, and a larger number when the camera slow or stationary, where fast and slow may be classified by a predetermined threshold value).

Alternatively or in addition, areas surrounding the known location of an entity such as an NPC may be more aggressively culled, where such locations have been captured.

Finally, normals may be generated from the depth data (depth buffer values). For example, for a given depth pixel (i.e. a depth value corresponding to a given image pixel), the surrounding depth values are used to create two vectors. The depth pixels above and below the current pixel form vector 1. The depth pixels to the left and to the right of the current pixel form vector 2. The cross product of these two vectors is an approximation to the normal. Optionally, passing the depth buffer through a bilateral filter first produces a better approximation of the normal.

Given the 3D point cloud derived from one or more sequences of video images output by the videogame title, a surface (e.g. a mesh) can be reconstructed for the game environment represented by the point cloud, using any suitable technique for generating a surface from a 3D point cloud, and in particular one that may have variable density and coverage.

Example techniques known in the art include a screened Poisson surface reconstruction based on the point cloud, and ball-pivot surface reconstruction based on the point cloud.

For the screened Poisson surface reconstruction, clipping of the resulting surface to a region within a predetermined distance of points within the point cloud may be used to limit the resulting surface to the known area of the game environment captured by the point cloud dataset.

As was noted previously herein, it will be appreciated that the methods described herein may be carried out on conventional hardware suitably adapted as applicable by software instruction or by the inclusion or substitution of dedicated hardware. Thus the required adaptation to existing parts of a conventional equivalent device may be implemented in the form of a computer program product comprising processor implementable instructions, stored or conveyed by any suitable means, as discussed previously.

Hence for example the hardware for an entertainment device operable to implement the mapping techniques described herein may be a conventional computing device such as a PlayStation 4 operating under suitable software instruction, comprising a video data processor (such as CPU 20A and/or GPU 20B) configured (for example by suitable software instruction) to obtain a first sequence of video images output by a videogame title; a camera position data processor (such as CPU 20A and/or GPU 20B) configured (for example by suitable software instruction) to obtain a corresponding sequence of in-game virtual camera positions at which the video images were created; a depth data processor (such as CPU 20A and/or GPU 20B) configured (for example by suitable software instruction) to obtain a corresponding sequence of depth buffer values for a depth buffer used by the videogame whilst creating the video images; and a mapping data processor (such as CPU 20A and/or GPU 20B) configured (for example by suitable software instruction), for each of a plurality of video images and corresponding depth buffer values of the obtained sequences, to obtain mapping points corresponding to a sampling distribution of points over the area of a respective video image and their associated depth values, wherein respective mapping points are obtained by projecting co-ordinates derived from the sample points from the video image and associated depth values back into a 3D game world co-ordinate system of the videogame title, thereby obtaining a point cloud dataset of mapping points corresponding to the first sequence of video images.

Combining 3D Mapping and Video Playback

In embodiments of the present invention a recorded or streamed video showing gameplay of a respective player during a game session is combined with a 3D map of the type described previously herein.

In principle, in this case the video only requires an associated description of the viewpoint of the first camera (i.e. the camera used when capturing video frames as described previously herein), but does not require other supplementary data such as depth data or event data (although either might be available). In particular the depth data is not needed, since the 3D map has already been formed.

The video is then displayed at a positon on the 3D map that corresponds with the position of the first camera when capturing the currently displayed video frame, optionally with any suitable offset along the optical axis of that first camera to account for a different playback viewpoint, as described later herein. Typically the video is rendered as a texture that is applied to a flat surface inserted into the reconstructed environment of the 3D map at the appropriate position.

As a result, the video can be thought of as a 2D video sequence that roams around the 3D map as it is played back, based on the changing position and orientation of the first camera with respect to the 3D map over the course of the footage within the video.

In addition, during playback a virtual second camera views the 3D map comprising this video sequence in order to provide a final view to a user.

Optionally the second camera can coincide with the position and orientation of the recorded camera position, so that the final view coincides with just the 2D video sequence. As will be appreciated from FIG. 15, the camera position and the actual position of an image plane may not be coincident, but may have a predetermined offset. If the relationship between the first camera and the 2D video and the second camera and the 2D video is different, then a corrective offset along the optical axis of the first camera can be used by the second camera so that the image plane of the 2D video coincides with the image plane of the second camera, so that the 2D video sequence properly and fully occupies the second camera image.

However, in response to a user input via a UI, and/or in response to a predetermined condition (or, where included as supplementary data, in response to a predetermined event indicated by event data), then the second camera can change position.

Figure 16:
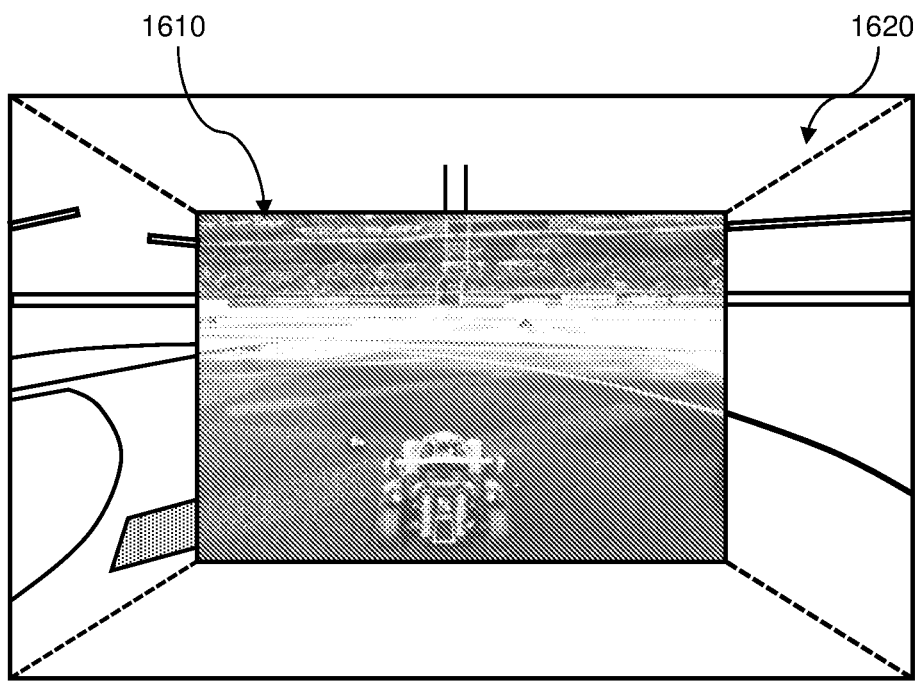
FIG. 16 illustrates a rendering of video footage aligned with a mapped 3D reconstruction of the environment within which the footage was captured, in accordance with embodiments of the present invention.

In one instance, referring now to FIG. 16, the second camera can pull back parallel to the optical axis of the first camera, so that the second camera captures a view of both the 2D video 1610 and some or all of the 3D map 1620.

In this way, the limited viewpoint of the original 2D image is expanded by the apparent integration of the video into a wider representation of the reconstructed 3D environment, with the viewpoint within that reconstructed 3D environment being updated responsive to the viewpoint of the 2D video so that this apparent integration remains consistent as the viewpoint of the 2D video changes.

It will be appreciated that optionally the user may be free to look around within the reconstructed 3D environment of the map, for example to look to the left, right above, below or behind the position of the second camera, which acts as their own viewpoint. The user may also be fee to move the second camera position in order to navigate the 3D map independently of the video. In these cases, however, a UI such as a button or menu item may allow the user to re-centre upon and track the video again. Meanwhile optionally the video may fade out to transparency and/or no longer be displayed if the user navigates beyond a certain range from the video, and/or beyond a certain angle away from the optical axis of the first camera.

Optionally further, data regarding other dynamic elements of the game (e.g. elements that may not be part of the reconstructed 3D environment, such as other players or in-game non-player characters) may be included as supplementary data with the video in the manner described previously herein, or in the case of a live stream, may optionally be received in parallel via another link within a network.

An indicator object representing of one or more dynamic elements and/or any other notable feature of the environment, (such as a finish line, health pack, or an event corresponding to associated event data, as applicable) can then be included within the reconstructed 3D environment to provide an idea of where they are with respect to the video viewpoint. This can provide the user/viewer with the ability to anticipate when an encounter with a dynamic element will occur, or track the progress of a dynamic element beyond the field of view of the 2D video.

Figure 17:
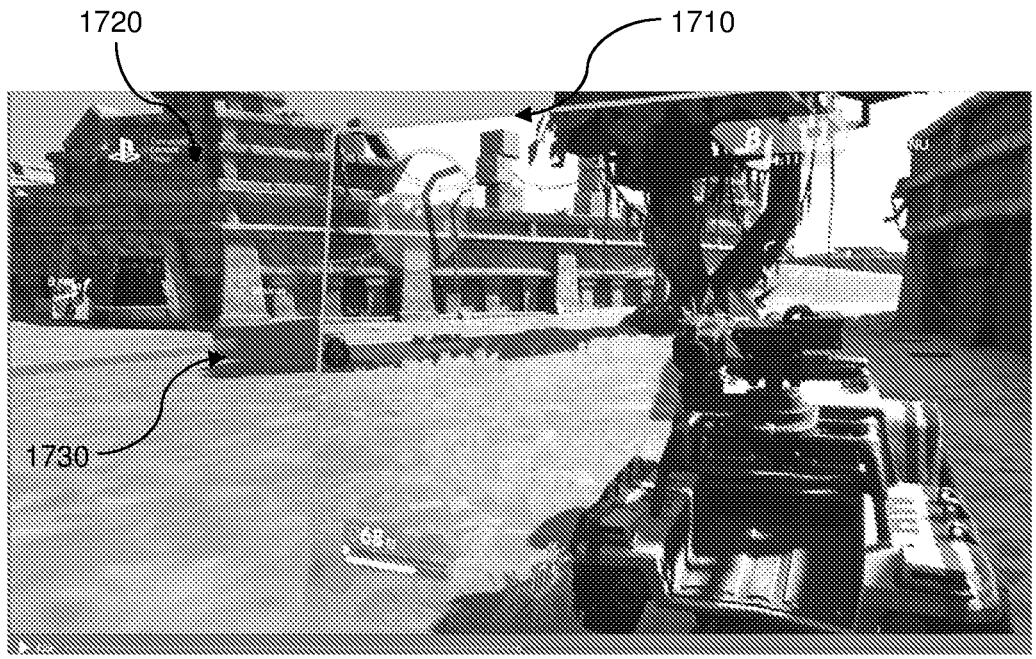
FIG. 17 illustrates a rendering of video footage aligned with a mapped 3D reconstruction of the environment within which the footage was captured, in accordance with embodiments of the present invention.

FIG. 17 provides an example of a view comprising a 1710 video, reconstructed 3D environment 1720 and an indicator object 1730 for a dynamic element (another player's car, and a trail of its position) within the game Overload®.

Optionally different representations/indicator objects can be used for different dynamic elements or other features, for example based on type. Such representations can be generic or tailored to the specific videogame to which the video relates.

In an embodiment of the present invention, the above techniques could be provided for a plurality of players within a single game session, so that a viewer could switch between recorded or streamed videos of different players, as well as viewing the wider reconstructed environment that those players are sharing by zooming out from the video viewpoint and/or turning/moving in a different direction, as described previously herein. Indeed, as a mechanism for switching player viewpoints, a system could automatically navigate through the 3D map between the viewpoints of respective first cameras of different players so that a viewer can appreciate their relative positions within the environment.

Such approaches would allow viewers/spectators to see more than any one given player can, and to get an overall view of what was (or indeed is, in the case of a live-event) happening at particular times in the game.

It will be appreciated that in such a case, the plurality of video streams need to be identified as being part of the same in-game session. This may be done by a unique game-session identifier, associated with each video or stream created during that session. This may optionally be included within a title of each recording or stream to enable a system to search for linked videos within a legacy hosting service such as YouTube® or Twitch®. Alternatively or in addition, each video or stream may optionally contain identifier pointing to at least one of the other videos or streams on a network (such as the internet), so that access to one stream enables eventual access to any of the others. Finally alternatively or in addition, separate information about a video/stream, including whether it is part of a group, may optionally be accessed from an administrative server. For example, an identifier or link similar to those noted above may instead be sent to and parsed by a server, which holds associative records indicating which, if any, other videos/streams correspond to the same game session.

It will be appreciated that, whilst as noted above the videos used within the 3D map do not need associated depth data, in principle a 3D map could be generated at the same time as one or more videos are hosted within it using such depth data and the techniques described herein, provided that the map and the videos/depth data all share a common reference. In this way a viewer could watch with the players as they explore and reveal a new map.

Hence whilst for many uses, such as e-sports coverage, it would be preferable to have already built a detailed reconstruction of the game environment, optionally the construction of a map as part of the documentary process of viewing a game session may be valuable for games where the environment is procedurally generated and is unique to that game session, or thanks to procedural generation is so large that it is not feasible to anticipate where the players will go, such as for example in a game like No Man's Sky®.

It will be appreciated that in such a case for pre-recorded videos, the most complete reconstruction of the environment would be achieved at the end of all the videos, and this could then be used from the start of any subsequent playback. Meanwhile for a live stream, the map would grow more complete as the stream went on.

It will be appreciated that an advantage of embedding videos within a 3D map/reconstruction of the wider environment shown within the videogame is that a system can control how that wider environment is displayed, potentially to enhance the enjoyment or understanding of the viewer.

Figure 18A:
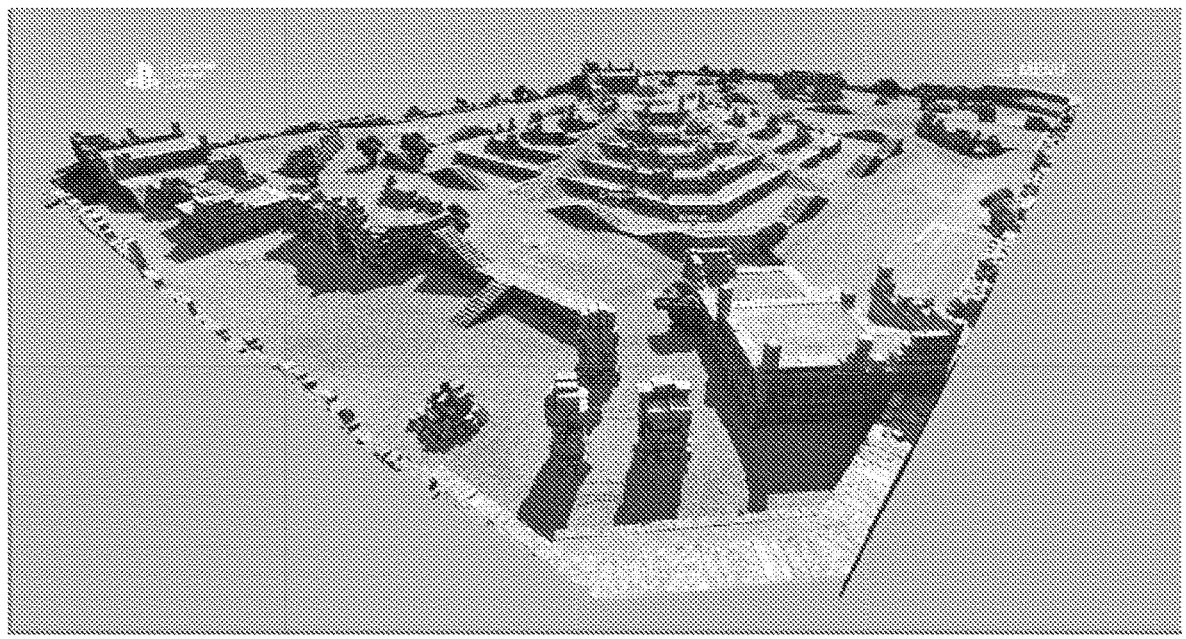
FIGS. 18A-C illustrate a mapped 3D reconstruction of an environment, in accordance with embodiments of the present invention.
Figure 18B:
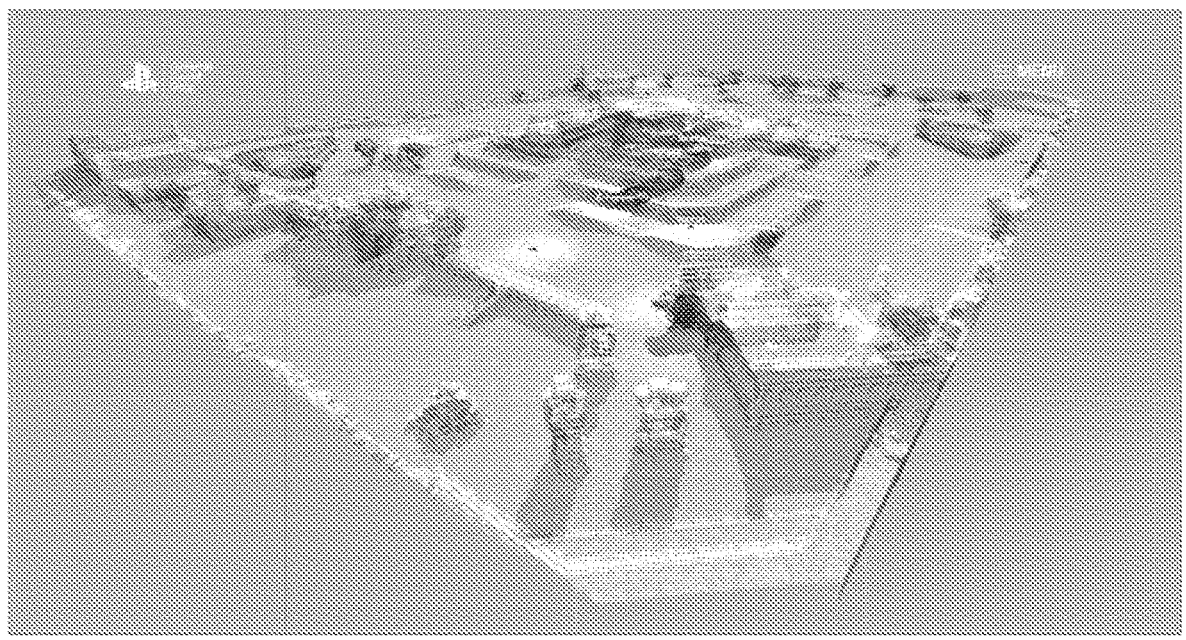
Figure 18C:
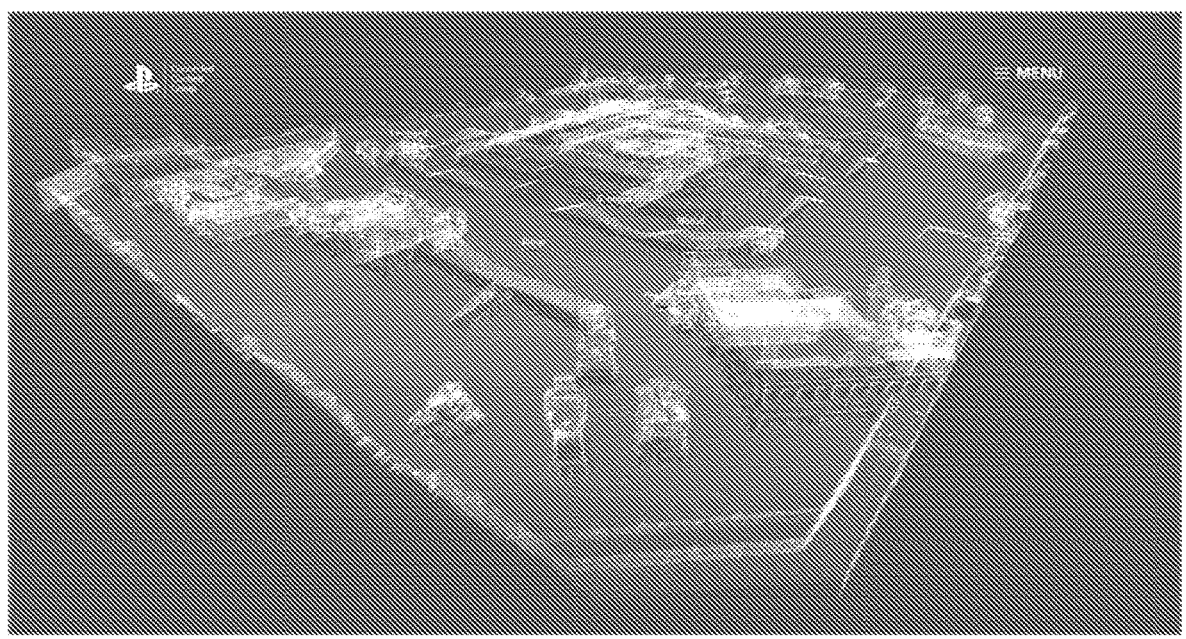

For example, the map can be displayed top-down or from an elevated vantage point, and/or as a blue-print (see FIG. 18B), or some or all of the environment can be rendered transparent or partially transparent (see FIG. 18C) so viewers can see action within interiors of buildings, caves, tunnels, etc. Where an indictor object representing a dynamic element such as a player or NPC is to be provided in conjunction with a transparent or semi-transparent rendering of the map, it may be displayed differently according to whether it is inside or outside a structure, or similarly whether it is occluded by a now-transparent feature of the environment. For example a representation of the dynamic element may be blurred and/or desaturated, or replaced with a glow. Any suitable change, typically consistent with the relevant game, may be considered by a designer. Optionally, one or more of a player, streamer, recorder, broadcaster, server administrator, or the viewer can select how they wish to the reconstruction, and optionally representations of dynamic elements, to be displayed.

As noted above it is be preferable to have already built a detailed reconstruction of the game environment, for example using the techniques described previously herein. However, it will be appreciated that there may be parts of an in-game environment that a player never looks at and hence never provides mapping information for, but which a viewer/spectator might do. An example may be a bridge or other structure in a racing game; players will tend to concentrate on what is ahead of them, and are unlikely to look back and hence provide image data about the opposite sides of structures in such a game.

To address this, a video (and associated depth data) may be recorded that deliberately explores such non-player views. This may be done within the normal operations of a game, for example by deliberately driving in the wrong direction on a race track to capture a complementary view of game assets. Alternatively or in addition it may be done by using a virtual 'drone', which may be provided by a game's developer, which can move freely within the game environment. A similar effect may be achieved by use of a cheat code or developer code to access modes such as so-called 'God mode' or 'no clip', which similarly allow free movement of the first camera, compared to normal gameplay. A drone or untethered virtual camera could be controlled by a user, or could follow a scripted or heuristically driven path to cover a predetermined distribution of positions within the game environment.

The 3D map may then be made using this video and depth data, or with the additional contribution of such information.

Notably, the present invention does not require access to game code, but instead relies upon a virtual camera and position and depth data to generate the 3D map, and a virtual camera and position data to subsequently embed one or more camera views within that 3D map.

Hence in principle the present invention can also be applied to mapping and showing real-world environments; for example, a formula 1 race track. If either a stereoscopic camera or a camera and depth mapping sensor were used on the track, together with GPS and/or other position tracking technologies, then a 3D map reconstructing the track could be generated from the combination of video, position and depth data (either obtained from the depth mapping sensor or from processing the stereoscopic images).

Subsequently conventional video feeds from one or more cars during a race, together with camera position data derived from GPS and/or other position tracking technologies, could be embedded within the 3D map in the manner described previously herein, and typically a broadcaster or viewer could change viewpoints, navigate the track, switch between drivers and the like as described herein previously for a virtual environment.

Such an approach could be used for any sport or event where the venue has been reconstructed in 3D (or could be reconstructed during a live stream as described previously herein) and for which videos with associated position tracking could be captured by one or more participants in the sport or event.

The above approach may be implemented by suitable software instruction using hardware such as the PS4® entertainment system (10) of FIG. 1, but in principle could be implemented by suitable software acting as a plug-in or other executable code within a browser.

To assist with managing the potential size of the 3D map reconstruction in a browser, the underlying data can be simplified to enable handling by the browser, and timely transmission to the browser.

The point cloud of the map can be broken up onto blocks manageable by the browser clients, and converted into triangles (polygons) for example using screened Poisson reconstruction. The resulting meshes can be further reduced in size using quadric mesh simplification. Then colour data from the nearest points within the relevant block of the point cloud can be used to paint the reduced mesh.

Data files can then be downloaded to the browser as polygon mesh chunks. Chunks for portions of the map not currently available can be downloaded when the second camera points toward such a portion, for example downloading chunks at a suitable draw distance from the current second camera position.

Optionally, a further reduced polygon mesh of a larger portion of the map (or the full the map) may be used when a chunk is not yet available, thereby providing a lower level of detail reconstruction if there are delays accessing a more detailed mesh.

The browser can synchronise received video with the 3D map on a frame by frame basis using the associated first camera position data, as previously described, and render the 3D map scene with the embedded video texture. The browser can switch between videos or streams in those cases where a user wants to change viewpoint between multiple players, by used of corresponding timestamps, frame counters or the like.

It will be appreciated that an application dedicated to the combined video and map technique may operate similarly, but may have access to processing and memory resources that mean mesh simplification is not required (or to a lesser extent) and/or that the mesh can be held in memory in its entirety (or in larger chunks).

Variants of Combined Map and Playback

Different first cameras may have different properties, such as different fields of view, and these can be associated with a video as supplementary data and used where necessary to modify the properties or positional offsets of the second camera.

One or more first cameras may be provided that do not correspond to players or participants within a game but may correspond to an NPC (thereby giving the NPC's perspective). Similarly, referring now also to FIG. 18A, one or more first cameras may provide an overview of all or part of the reconstructed environment from a high and/or distant vantage point; this could provide a summary view of the session that is faithful to what is displayed (e.g. all players are shown as they are rendered in-game), but a used could then navigate 'though' this vantage point and down into the 3D map to join the viewpoint of a participant, or simply inspect the mapped environment more closely. In a live stream of an event, this camera may be under the control of the broadcaster to provide relevant overviews of the action. As noted previously this could be done using a drone or developer feature such as no-clip or god-mode.

In addition to embedding a video image within the 3D map, indicator objects (such as for dynamic elements) may be rendered; optionally, some of these may be provided on top of the video image (e.g. in front of the image from the viewpoint of the second camera, despite being behind the video image on the map from that same viewpoint).

Figure 19A:
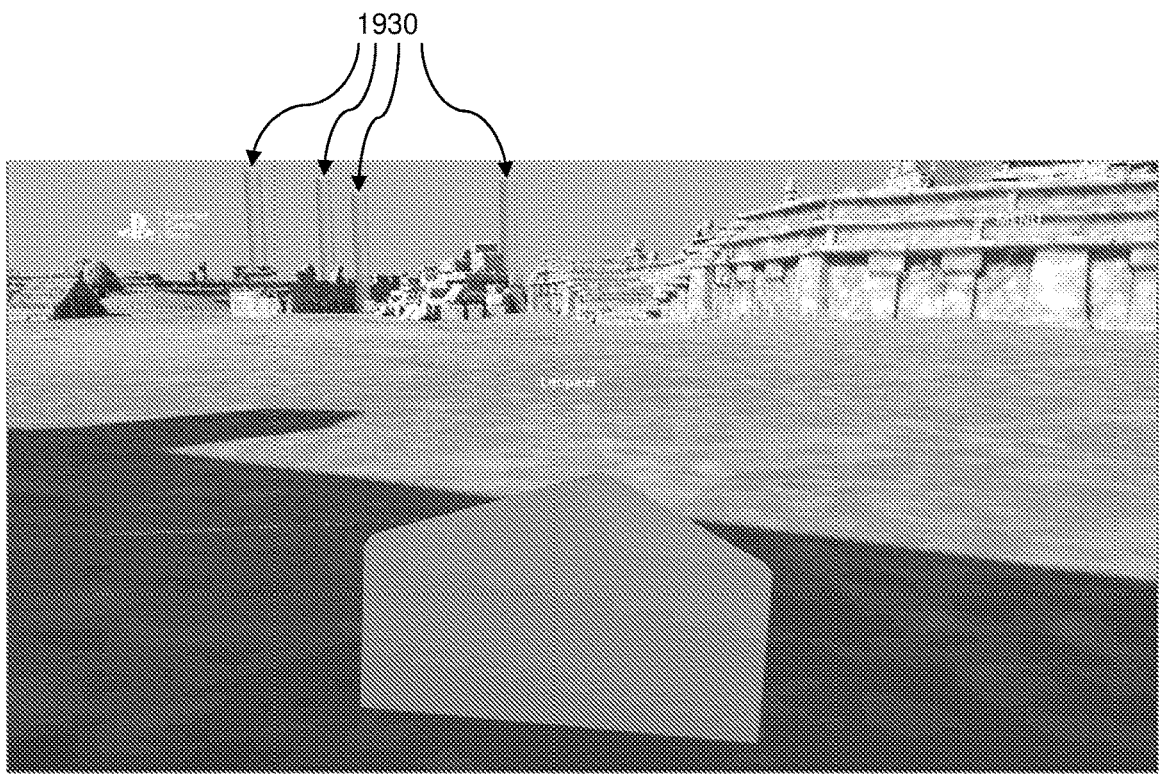
FIG. 19A illustrates a mapped 3D reconstruction of an environment together with indicator objects, in accordance with embodiments of the present invention.

FIG. 19A shows a render of the 3D map together with dynamic objects (a triangular wedge indicating the position and direction of the player associated with the first camera, and a series of columns 1930 indicating the locations of key items).

Figure 19B:
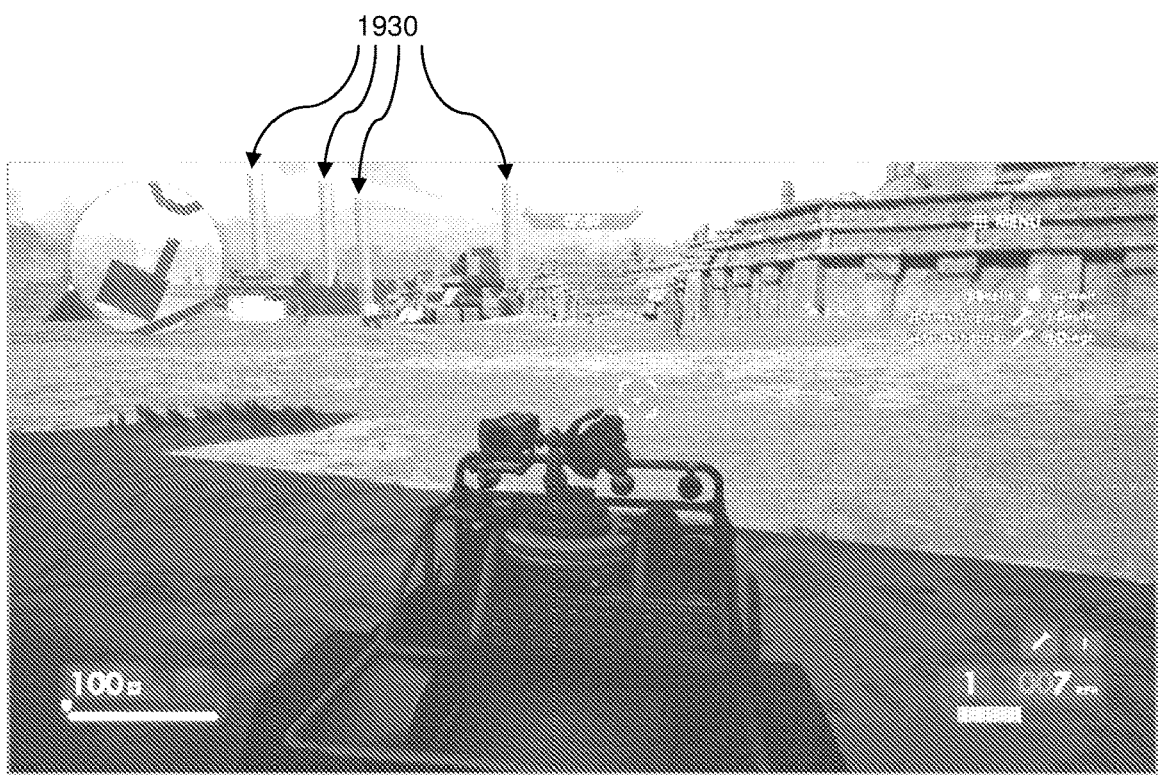
FIG. 19B illustrates a mapped 3D reconstruction of an environment and aligned video footage, together with indicator objects rendered to be visible in front of the video footage, in accordance with embodiments of the present invention.

FIG. 19B shows the integration of the video image, with the rendered vehicle of the player replacing the wedge, but the columns 1930 being rendered last (with respect to the 3D model and video) to provide an integrated overlay that appears consistent with the video image.

Figure 20:
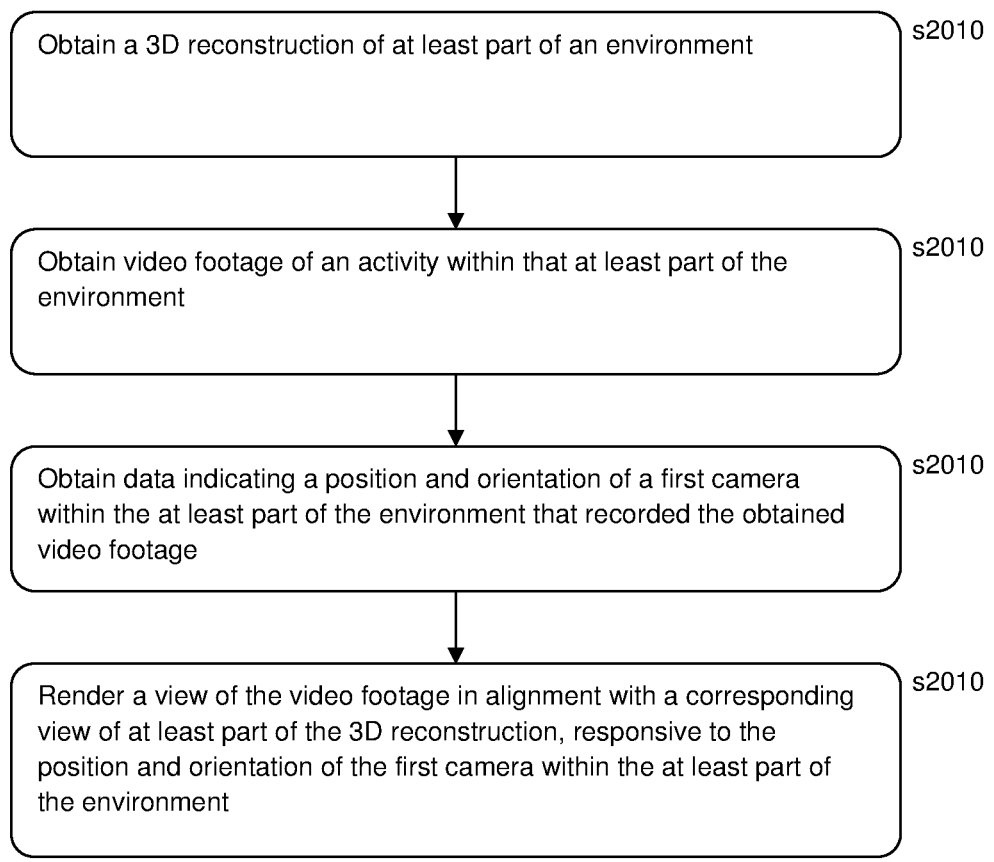
FIG. 20 is a flow diagram of a method of video playback in accordance with embodiments of the present invention.

Referring now to FIG. 20, in a summary embodiment of the present invention, a method of video playback comprises:

in a first step s2010, obtaining a 3D reconstruction of at least part of an environment;
  in a second step s2020, obtaining video footage of an activity within that at least part of the environment;
  in a third step s2030, obtaining data indicating a position and orientation of a first camera within the at least part of the environment that recorded the obtained video footage; and
  in a fourth step s2010, rendering a view of the video footage in alignment with a corresponding view of at least part of the 3D reconstruction, responsive to the position and orientation of the first camera within the at least part of the environment.

It will be apparent to a person skilled in the art that variations in the above method corresponding to operation of the various embodiments of the apparatus as described and claimed herein are considered within the scope of the present invention, including but not limited to:

the environment and the first camera being either real or virtual as described previously herein;
  rendering at the viewpoint of a second, virtual camera positioned at a predetermined offset along the optical axis of the first camera, as described previously herein;
  altering the rendering viewpoint of a second camera in response to an input from a user, as described previously herein;
  returning the rendering viewpoint of a second, virtual camera from its current position to a position having a predetermined offset along the optical axis of a first camera as described previously herein (for example either for the previously viewed first camera so as to return to existing footage, or the first camera associated with a switched video feed so as to navigate across the map to the in-map position of the new footage);

a first camera being one selected from the list consisting of a virtual camera coincident with the viewpoint of a player within a virtual environment, a virtual camera coincident with the viewpoint of a non-player character within a virtual environment, and a virtual camera positioned independently of any player or non-player character within a virtual environment, at a raised vantage point (for example as a virtual drone used for this purpose, or equivalently using a god-mode or no-clip mode viewpoint, which if applied to a player viewpoint can be understood to take the player out of conventional play and convert them into such a drone);

multiple instances of video footage and associated camera position and orientation data being available (for example corresponding to a plurality of players in a multiplayer game, or one or more players and one or more NPCs), and obtaining second video footage of an activity within that at least part of the environment, together with data indicating the associated camera position and orientation within the at least part of the environment, switching to the second video footage; and in which the rendering step comprises switching to render a view of the second video footage in alignment with a corresponding view of at least part of the 3D reconstruction, responsive to the associated camera position and orientation within the at least part of the environment;

the 3D reconstruction of at least part of virtual environment being obtained from images, depth data and camera position data generated by a virtual camera that does not correspond to an in-game participant and is free to move in three dimensions (for example using a drone or free navigation mode as described previously, optionally in conjunction with the data-supplemented recording or streaming techniques described previously herein);

the 3D reconstruction of at least part of virtual environment being obtained from images, depth data and camera position data generated by one or more participants of a videogame (for example using the data-supplemented recording or streaming techniques described previously herein);

in these latter two cases, the 3D reconstruction comprising the steps of obtaining a first sequence of video images output from a videogame title, obtaining a corresponding sequence of in-game virtual camera positions at which the video images were created, obtaining a corresponding sequence of depth buffer values for a depth buffer used by the videogame whilst creating the video images, and for each of a plurality of video images and corresponding depth buffer values of the obtained sequences, obtaining mapping points corresponding to a sampling distribution of points over the area of a respective video image and their associated depth values, wherein respective mapping points are obtained by projecting co-ordinates derived from the sample points from the video image and associated depth values back into a 3D game world co-ordinate system of the videogame title, thereby obtaining a point cloud dataset of mapping points corresponding to the first sequence of video images;

each of one or more obtained video footage being one or more selected from the list consisting of previously recorded video footage, and a live video stream;

video footage for a plurality of simultaneous viewpoints being available (again for example from a plurality of players in a multiplayer game), and obtaining a session ID associated with at least a first one of the videos, and identifying and obtaining at least a second one other of the videos using the session ID (for example by searching for that ID in a legacy or dedicated hosting service, or using the ID to directly access an indicated source of the video footage there the ID enable this), and in which the step of rendering a view comprises switching from the first video to the second video, and rendering a view of the second video footage in alignment with a corresponding view of at least part of the 3D reconstruction, responsive to the position and orientation of the first camera in the second video footage within the at least part of the environment; and rendering one or more representations of virtual dynamic objects, the dynamic objects not being part of the 3D reconstruction and being located with respect to the second camera and the 3D reconstruction behind the video image, the representations of virtual dynamic objects being displayed in front of the video image, as described previously in conjunction with FIGS. 19A and 19B.

As noted elsewhere herein, these methods may be carried out on conventional hardware suitably adapted as applicable by software instruction or by the inclusion or substitution of dedicated hardware, in the form of a computer program product comprising processor implementable instructions stored on a non-transitory machine-readable medium, realised in hardware, or transmitted via data signals, as previously described.

Hence for example, an entertainment device 10 such as the Sony PlayStation 4 ®, may comprise a receiver (such as Ethernet® or Wifi® ports 32, 34, in conjunction with CPU 20A running under suitable software instruction) operable to obtain a 3D reconstruction of at least part of an environment; a receiver (such as Ethernet® or Wifi® ports 32, 34, in conjunction with CPU 20A running under suitable software instruction) operable to obtain video footage of an activity within that at least part of the environment; a receiver (such as Ethernet® or Wifi® ports 32, 34, in conjunction with CPU 20A running under suitable software instruction) operable to obtain data indicating a position and orientation of a first camera within the at least part of the environment that recorded the obtained video footage; and a rendering processor (Such as GPU 20B and/or CPU 20A running under suitable software instruction) operable to render a view of the video footage in alignment with a corresponding view of at least part of the 3D reconstruction, responsive to the position and orientation of the first camera within the at least part of the environment.

It will also be appreciated that under suitable software instruction such an entertainment device will be operable to implement the other methods and techniques described herein.

The invention claimed is:

1. A method of video playback, comprising:
obtaining a 3D reconstruction of at least part of an environment;
obtaining video footage of an activity within that at least part of the environment;
obtaining data indicating a position and orientation of a first camera within the at least part of the environment that recorded the obtained video footage; and
rendering a view of the video footage in alignment with a corresponding view of at least part of the 3D reconstruction, responsive to the position and orientation of the first camera within the at least part of the environment, wherein:

the 3D reconstruction of at least part of virtual environment is obtained from images, depth data and camera position data generated by at least one of: (i) a virtual camera that does not correspond to an in-game participant and is free to move in three dimensions, and (ii) one or more participants of a videogame, and the obtaining the 3D reconstruction of at least part of the environment includes:

obtaining a first sequence of video images output from a videogame title;

obtaining a corresponding sequence of in-game virtual camera positions at which the video images were created;

obtaining a corresponding sequence of depth buffer values for a depth buffer used by the videogame whilst creating the video images; and for each of a plurality of video images and corresponding depth buffer values of the obtained sequences, obtaining mapping points corresponding to a sampling distribution of points over the area of a respective video image and their associated depth values; wherein respective mapping points are obtained by projecting co-ordinates derived from the sample points from the video image and associated depth values back into a 3D game world co-ordinate system of the videogame title, thereby obtaining a point cloud dataset of mapping points corresponding to the first sequence of video images.

2. The method of video playback according to claim 1, in which the environment and the first camera are virtual.

3. The method according to claim 1, in which the step of rendering comprises:

rendering at the viewpoint of a second, virtual camera positioned at a predetermined offset along the optical axis of the first camera.

4. The method according to claim 1, comprising altering the rendering viewpoint of a second camera in response to an input from a user.

5. The method according to claim 4, comprising returning the rendering viewpoint of a second, virtual camera from its current position to a position having a predetermined offset along the optical axis of the first camera.

6. The method according to claim 1, in which a first camera is one or more of:
  i. a virtual camera coincident with the viewpoint of a player within a virtual environment;
  ii. a virtual camera coincident with the viewpoint of a non-player character within a virtual environment; and
  iii. a virtual camera positioned independently of any player or non-player character within a virtual environment, at a raised vantage point.

7. The method according to claim 1, in which multiple instances of video footage and associated camera position and orientation data are available, the method comprising:

obtaining second video footage of an activity within that at least part of the environment, together with data indicating the associated camera position and orientation within the at least part of the environment; and switching to the second video footage;

and in which the rendering step comprises:

switching to render a view of the second video footage in alignment with a corresponding view of at least part of the 3D reconstruction, responsive to the associated camera position and orientation within the at least part of the environment.

8. The method according to claim 1, in which each of one or more obtained video footage is one or more of:
  i. previously recorded video footage; and
  ii. a live video stream.

9. The method according to claim 1 in which video footage for a plurality of simultaneous viewpoints is available, the method comprising the steps of:

obtaining a session ID associated with at least a first one of the videos; and identifying and obtaining at least a second one other of the videos using the session ID;

and in which the step of rendering a view comprises switching from the first video to the second video; and rendering a view of the second video footage in alignment with a corresponding view of at least part of the 3D reconstruction, responsive to the position and orientation of the first camera in the second video footage within the at least part of the environment.

10. The method according to claim 1 in which the step of rendering a view comprises the step of:

rendering one or more representations of virtual dynamic objects, the dynamic objects not being part of the 3D reconstruction and being located with respect to the second camera and the 3D reconstruction behind the video image, the representations of virtual dynamic objects being displayed in front of the video image.

11. A non-transitory, computer readable medium having computer executable instructions stored thereon, which when executed by a computer system, cause the computer system to perform a method of video playback, comprising:

obtaining a 3D reconstruction of at least part of an environment;

obtaining video footage of an activity within that at least part of the environment;

obtaining data indicating a position and orientation of a first camera within the at least part of the environment that recorded the obtained video footage; and rendering a view of the video footage in alignment with a corresponding view of at least part of the 3D reconstruction, responsive to the position and orientation of the first camera within the at least part of the environment, wherein:

the 3D reconstruction of at least part of virtual environment is obtained from images, depth data and camera position data generated by at least one of: (i) a virtual camera that does not correspond to an in-game participant and is free to move in three dimensions, and (ii) one or more participants of a videogame, and the obtaining the 3D reconstruction of at least part of the environment includes:

obtaining a first sequence of video images output from a videogame title;

obtaining a corresponding sequence of in-game virtual camera positions at which the video images were created;

obtaining a corresponding sequence of depth buffer values for a depth buffer used by the videogame whilst creating the video images; and for each of a plurality of video images and corresponding depth buffer values of the obtained sequences, obtaining mapping points corresponding to a sampling distribution of points over the area of a respective video image and their associated depth values; wherein respective mapping points are obtained by projecting co-ordinates derived from the sample points from the video image and associated depth values back into a 3D game world co-ordinate system of the videogame title, thereby obtaining a point cloud dataset of mapping points corresponding to the first sequence of video images.

12. An entertainment device, comprising
a receiver operable to obtain a 3D reconstruction of at least part of an environment;
a receiver operable to obtain video footage of an activity within that at least part of the environment;
a receiver operable to obtain data indicating a position and orientation of a first camera within the at least part of the environment that recorded the obtained video footage; and
a rendering processor operable to render a view of the video footage in alignment with a corresponding view of at least part of the 3D reconstruction, responsive to the position and orientation of the first camera within the at least part of the environment, wherein:
the 3D reconstruction of at least part of virtual environment is obtained from images, depth data and camera position data generated by at least one of: (i) a virtual camera that does not correspond to an in-game participant and is free to move in three dimensions, and (ii) one or more participants of a videogame, and
the obtaining the 3D reconstruction of at least part of the environment includes:
obtaining a first sequence of video images output from a videogame title;
obtaining a corresponding sequence of in-game virtual camera positions at which the video images were created;
obtaining a corresponding sequence of depth buffer values for a depth buffer used by the videogame whilst creating the video images; and
for each of a plurality of video images and corresponding depth buffer values of the obtained sequences, obtaining mapping points corresponding to a sampling distribution of points over the area of a respective video image and their associated depth values; wherein respective mapping points are obtained by projecting co-ordinates derived from the sample points from the video image and associated depth values back into a 3D game world co-ordinate system of the videogame title, thereby obtaining a point cloud dataset of mapping points corresponding to the first sequence of video images.

* * * * *